United States Patent
Gärdenfors et al.

(10) Patent No.: US 9,218,119 B2
(45) Date of Patent: Dec. 22, 2015

(54) SYSTEM AND METHOD FOR GESTURE DETECTION AND FEEDBACK

(75) Inventors: Dan Gärdenfors, Maimö (SE); Karl-Anders Johansson, Staffanstorp (SE); James Haliburton, San Francisco, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 629 days.

(21) Appl. No.: 13/072,328

(22) Filed: Mar. 25, 2011

(65) Prior Publication Data

US 2011/0234543 A1    Sep. 29, 2011

Related U.S. Application Data

(60) Provisional application No. 61/317,288, filed on Mar. 25, 2010.

(51) Int. Cl.
| G06F 3/041 | (2006.01) |
| G06F 3/0488 | (2013.01) |
| G06F 3/00 | (2006.01) |
| G06F 3/01 | (2006.01) |
| H04N 13/02 | (2006.01) |

(52) U.S. Cl.
CPC ............. *G06F 3/0488* (2013.01); *G06F 3/005* (2013.01); *G06F 3/017* (2013.01); *G06F 3/041* (2013.01); *G06F 3/0416* (2013.01); *H04N 13/0239* (2013.01)

(58) Field of Classification Search
USPC ................. 345/173, 175; 340/4.1; 715/863
See application file for complete search history.

(56) References Cited

U.S. PATENT DOCUMENTS

| 5,890,120 | A | * | 3/1999 | Haskell et al. ............... 704/271 |
| 2003/0156756 | A1 | | 8/2003 | Gokturk et al. |
| 2004/0189720 | A1 | * | 9/2004 | Wilson et al. ................. 345/863 |
| 2005/0271279 | A1 | * | 12/2005 | Fujimura et al. ............. 382/203 |
| 2009/0103780 | A1 | | 4/2009 | Nishihara et al. |
| 2009/0322888 | A1 | | 12/2009 | Wuerz-Wessel et al. |
| 2010/0079508 | A1 | * | 4/2010 | Hodge et al. .................. 345/697 |
| 2010/0090971 | A1 | * | 4/2010 | Choi et al. .................... 345/173 |
| 2010/0138785 | A1 | | 6/2010 | Uoi et al. |
| 2010/0173679 | A1 | * | 7/2010 | Moon .......................... 455/566 |
| 2011/0095862 | A1 | * | 4/2011 | Yang et al. .................... 340/4.1 |

(Continued)

FOREIGN PATENT DOCUMENTS

| EP | 2090961 A1 | 8/2009 |
| WO | 2008/029467 A1 | 3/2008 |
| WO | 2009/157633 A1 | 12/2009 |

OTHER PUBLICATIONS

Extended European Search Report mailed Sep. 7, 2012, in corresponding European patent application No. 11159922.1.

(Continued)

*Primary Examiner* — Jason Olson
*Assistant Examiner* — Sosina Abebe
(74) *Attorney, Agent, or Firm* — Fish & Richardson P.C.

(57) ABSTRACT

A computer device with a sensor subsystem for detecting off-surface objects, that carries out continued processing of the position and shape of objects detected in the vicinity of the device, associates these positions and shapes with predetermined gesture states, determines if the object is transitioning between gesture states and provides feedback based on the determined transition between the gesture states.

10 Claims, 43 Drawing Sheets

(56) References Cited

U.S. PATENT DOCUMENTS

2011/0205164 A1* 8/2011 Hansen et al. ................. 345/173
2011/0209099 A1* 8/2011 Hinckley et al. .............. 715/863
2011/0248963 A1* 10/2011 Lawrence et al. ............. 345/175

OTHER PUBLICATIONS

Office Action mailed May 29, 2013, in corresponding Canadian patent application No. 2,735,325.

* cited by examiner a)

b)

a)

b)

c)

SYSTEM AND METHOD FOR GESTURE DETECTION AND FEEDBACK

CROSS-REFERENCE TO RELATED APPLICATIONS

This application claims priority from and is related to the following prior application: "System and Method for Gesture Detection and Feedback," U.S. Provisional Application No. 61/317,288, filed Mar. 25, 2010.

FIELD OF THE TECHNOLOGY

This application relates generally to computer systems and more particularly to 2D and 3D gesture input and recognition, and graphical user interface for computer systems.

BACKGROUND

There exists devices capable of 2D and 3D gesture inputs for interacting with graphical user interfaces for computer systems. These provide an additional mode of user input aside from those traditionally employed, such as pointing devices like trackpads or computer mice.

SUMMARY

The present inventors have realised that in the field of gesture interaction with computer system, two primary concerns are prevalent:

1) The user of a gesture powered user interface is often at a loss as to how to interact with it. This is due to many reasons; one being poor feedback of when the system interprets some action on the user's part as a gesture. That, or the system constructors simply tries to reinvent old metaphors such as "pointing and clicking", not taking into account the inherent physical differences in moving a computer mouse and pointing in mid-air, most often failing due to lack of precision. Only trying to emulate a mouse is a misguided approach, as this closes the door for many novel interaction techniques 2) Off-surface object detection is typically done using one or more cameras; using triangulation if more than one is used. In some cases camera sensors measuring the time-of-flight for infrared light bounced on the objects is used. This gives the actual distance to the object being detected. Cameras of any kind however consume quite a lot of power, and in addition to the cameras, substantial processing power on a central processing unit or a digital signal processor must also be used to interpret the camera images to detect any objects. Since off-surface object detection relies on sensors being switched on constantly, power consumption for such detection is constantly high, making it unsuitable for portable devices.

The proposed solutions brings together and improves on the prior art in primarily two ways:

1) Feedback, preferably continuous, indicating to the end user what is about to happen if a certain gesture is completed—thus adding an exploratory level to the user interface.

Thus, from one aspect, the proposed solution provides: a computing device, comprising: a display; a sensor subsystem for detecting off-surface objects; memory having instructions stored on it which when run on a processor, causes the processor to perform the steps of: detecting an off-surface object using the sensor subsystem; determining a position and a shape of said detected off-surface object; matching the determined position with a set of reference zones and the determined shape with a set of reference poses to thereby determine a gesture state; detecting changes in the determined position and shape using the sensor subsystem; matching said changes in the determined position with transitions between said reference zones and matching said changes in determined shapes with transitions between said reference poses to thereby determine a transition between gesture states; and, instructing a user interface to provide feedback based on the determined transition between gesture states.

Certain exemplary features of the embodiments of the above aspect of the proposed solution are set out in the appended claims.

From another aspect, the proposed solution provides: a computer-implemented method, for operating a computing device comprising a display, sensor sub system, processor and memory, comprising the steps of: detecting an off-surface object using the sensor subsystem; determining a position and a shape of said detected off-surface object; matching the determined position with a set of reference zones and the determined shape with a set of reference poses to thereby determine a gesture state; detecting changes in the determined position and shape using the sensor subsystem; matching said changes in the determined position with transitions between said reference zones and matching said changes in determined shapes with transitions between said reference poses to thereby determine a transition between gesture states; and, instructing a user interface to provide feedback based on the determined transition between gesture states.

From yet another aspect, the proposed solution provides: A computer program product having instructions which when run on a processor causes the processor to carry out the above method.

These three aspects achieve provision of feedback to the end user by tightly coupling changes in determined positions and shapes of the detected objects to immediate and continuous feedback in the user interface. A state machine keeps track of in what discrete state the object is with respect to position and shape, but by also considering the state transition graph, it is possible to deduce where in between two poses the current shape is, and also in between which activation zones the current position is. That information is used to hint the user as to what would happen if the current gesture is continued or made stronger. This invites to "playing" with the user interface for exploring new features as the user can interact with the system using small/subtle gestures and not risk triggering any functionality, but rather just get a feel for what gestures are linked to what functionality.

The second way the proposed solution improves on the prior art is:

2) Improved power consumption while at the same time minimizing detection of spurious gestures by giving the end user direct control of when the gesture detection subsystem is in an active state.

Thus, from a fourth aspect, the proposed solution provides: a computing device, comprising: a display; a sensor subsystem for detecting off-surface objects; a means for detecting user input; memory having instructions stored on it which when run on a processor, causes the processor to perform the steps of: detecting an off-surface object using the sensor subsystem; determining a position and a shape of said detected off-surface object; matching the determined position with a set of reference zones and the determined shape with a set of reference poses to thereby determine a gesture state; setting the sensor subsystem to a powered-on state when the means for detecting a user input has detected a predetermined user input.

Certain exemplary features of the embodiments of the first aspect of the proposed solution set out in the appended claims can also be applied to the embodiments of the fourth aspect of the proposed solution.

From a further aspect, the proposed solution provides: a computer-implemented method for use in a computing device comprising a display, a sensor subsystem, a means for detecting user input, a processor and memory, comprising the steps of: detecting an off-surface object using the sensor subsystem; determining a position and a shape of said detected off-surface object; matching the determined position with a set of reference zones and the determined shape with a set of reference poses to thereby determine a gesture state; setting the sensor subsystem to a powered-on state when the means for detecting a user input has detected a predetermined user input.

From a final aspect, the proposed solution provides: a computer program product having instructions which when run on a processor causes the processor to carry out the above method.

The above three aspects achieve improved power consumption by tightly coupling the powering up of the off-surface gesture detection subsystem to an intentional gesture on the surface of the device. The on-surface gesture can be anything from the pressing of a hardware button or a simple touch on a touch screen, to a complex multi touch gesture. This not only conserves power, but also makes the user aware of the system being in a gesture sensitive mode and makes the user behave accordingly.

As will become clear from reading the detailed description of the exemplary embodiments, which are provided by way of example only, and seeing the figures illustrating the use cases, the aspects above are powerful enough by themselves, but the combination opens up for entirely new use cases from an interaction point-of-view with extremely low power usage.

DETAILED DESCRIPTION OF THE EXEMPLARY EMBODIMENTS

We will now examine in detail a small number of exemplary embodiments of the proposed solution. The accompanying drawings are used to illustrate aspects of these embodiments in particular and aspects of the proposed solution in general. While the proposed solution will be described in conjunction with a set of exemplary embodiments, it will be understood that it is not intended to limit the application to one or a few exemplary embodiment. To the contrary, the appended claims are intended to be interpreted as covering all alterations, modifications, and equivalents of the described embodiments within the true spirit and scope of the application.

Figure 1:
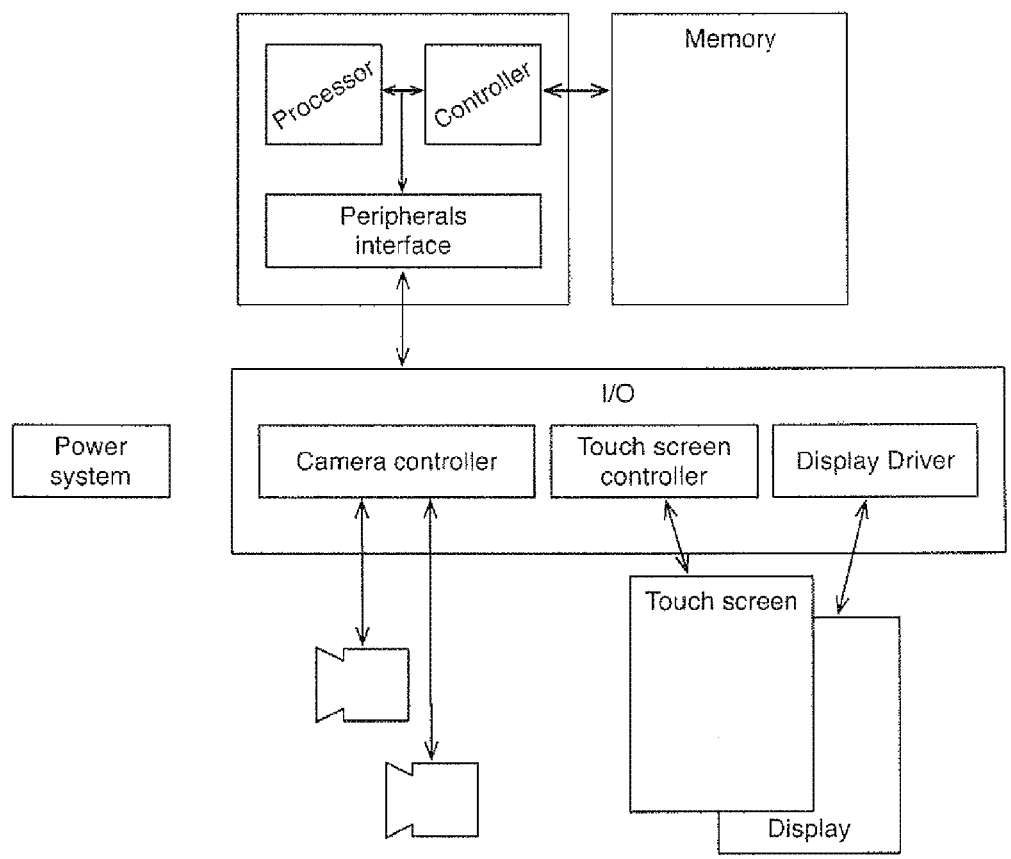
FIG. 1 is a block diagram of an example computer system in accordance with the application.
Figure 2:
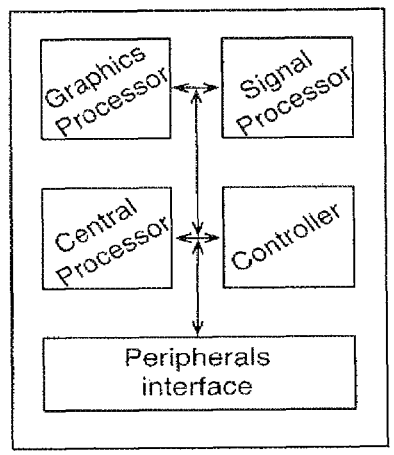
FIG. 2 contains an example of a modification to the computer system block diagram related to the processor configuration.
Figure 3:
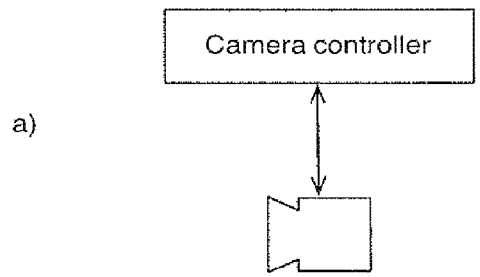
FIG. 3 contains further examples of modifications to the computer system block diagram related to camera input, most specifically to the possibilities of using a) a single camera, and b) a depth-sensing camera.
Figure 3:
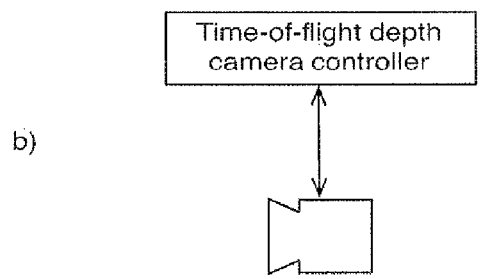
Figure 4:
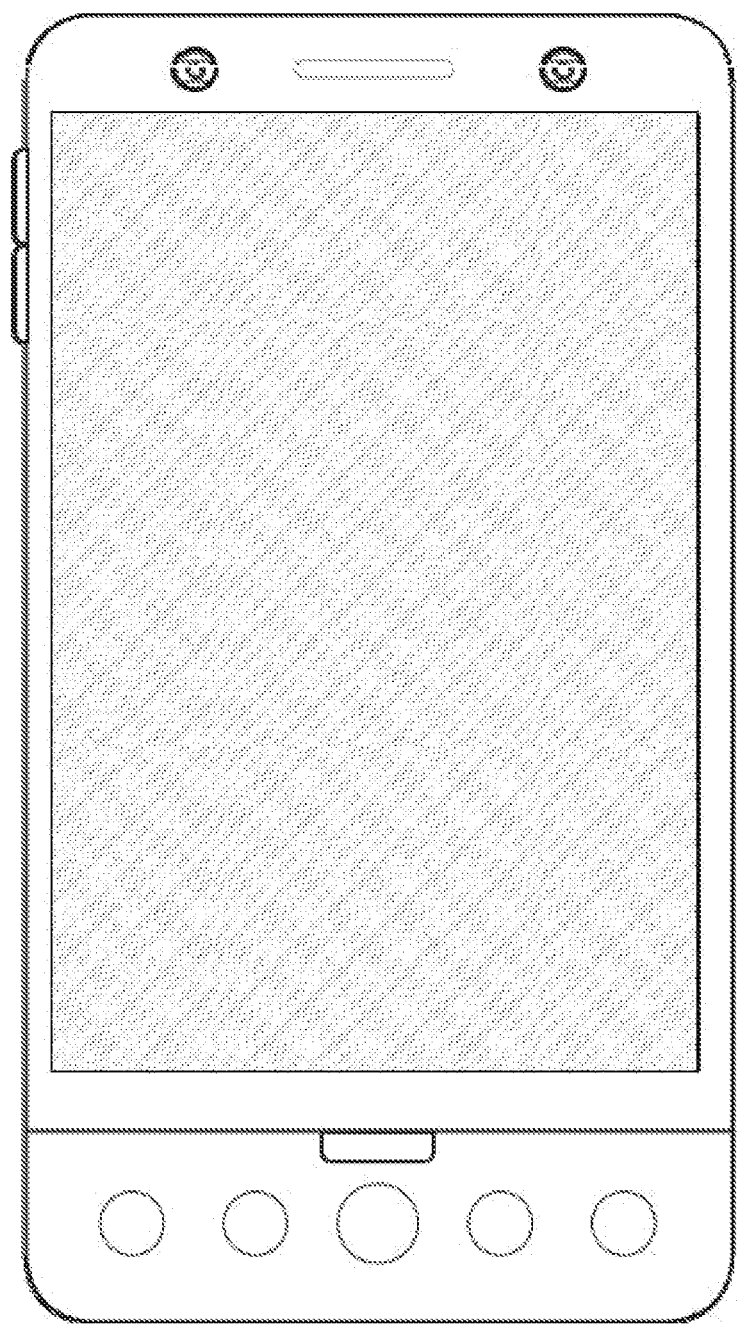
FIG. 4 contains an example of a physical embodiment of the proposed solution, showing a portable device with a touch screen and stereoscopic cameras for gesture interaction.

Referring to the figures now, FIG. 4 illustrates an example physical embodiment of the proposed solution: a portable device equipped with a touch screen and two front-facing cameras in a stereoscopic configuration. FIG. 1 shows an example block diagram, showing how a processor can access and process the camera data, storing determined object positions and shapes in memory and also drawing a graphical user interface on the display, partly based on the information about the determined object positions and shapes stored in memory. The power system is under the processor's control and controls the power to the various system blocks. Further, FIG. 2 illustrates an example alternative processor macro block, featuring a dedicated graphical processor that could aid in drawing the user interface, and a dedicated signal processor that could aid in processing the camera data. FIG. 3 illustrates example alternative camera setups, $a$) using a single camera, $b$) using a true depth sensing time-of-flight camera module. In the end, the exact choice of object detection method is not the topic for this application, but rather the continued processing of the determined position and shapes of the detected objects in the vicinity of the device, ending up with a more usable, more energy efficient, and more exploratory gesture user interface.

Focusing on one aspect, the proposed solution is particularly well suited for gesture recognition on a portable device where power consumption is a major concern. This is due to the novel combination gesture approach illustrated in the simplified use cases of FIGS. 15, 16 and 17. In FIGS. 15 $a$) and $b$) the subsystem for detecting objects, including the cameras, is powered down and the gesture in $b$) goes undetected. Not until the user, as in $c$), activates the system with a finger on the display, can the user as in $d$) interact with the user interface using gestures. The interaction is illustrated with a simple square transitioning into a star. It is implied that any user interface change can occur due to the gesture interaction. Note that in this use case, it is enough to touch anywhere on the screen to activate the gesture detection. FIG. 16 illustrates how touching specific objects in the user interface can affect the user interface differently. In $a$) we see two 3D cubes. In $b$) the user holds a finger one of the cubes and therefore powers up the sensor subsystem for detecting objects so that in $c$) the selected cube is rotated when the user performs an appropriate gesture in front of the device. $d$) shows a different interaction paradigm where the cube beneath the finger is held still and the other cube is rotated instead. This use case of course extends to being able to press outside the cubes and rotate the "world" or "camera". Of course this also extends to other interactions than rotation as well, such as scrolling a list, selecting items, switching between discrete views etc. FIG. 17 illustrates yet another example of how one interaction can trigger the off-screen gesture detection. In FIGS. 17 $a$) and $b$), just like in FIGS. 15 $a$) and $b$), the subsystem for detecting objects, including the cameras, is powered down and the gesture in $b$) goes undetected. Not until the user, as in 17 $c$), activates the system by pressing a dedicated hardware button can the user as in 17 $d$) interact with the user interface using gestures. In an alternate interaction paradigm, illustrated in 17 $e$) is the off-surface gesture detection subsystem activated after pressing the button once, as opposed to keeping it pressed during the gesture. The interaction in FIG. 17 is just as in FIG. 15 illustrated with a simple square transitioning into a star. Like above, it is implied that any user interface change can occur due to the gesture interaction.

Figure 12A:
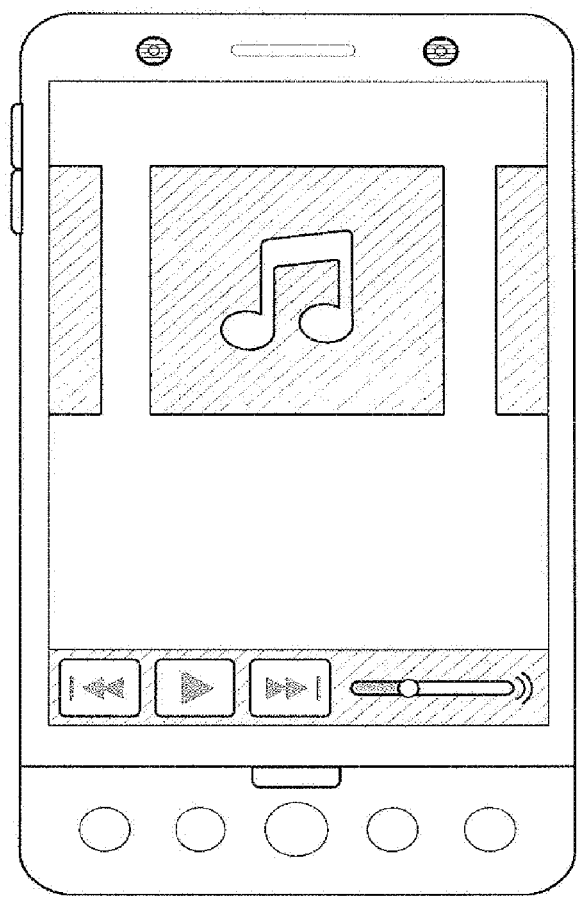
FIG. 12 illustrates a first feedback use case: a) a media player in an idle state, b) a subtle motion gesture to the left indicate the functionality behind further motion to the left ("next track"), and c) a distinct motion gesture to the left activates "next track".
Figure 12B:
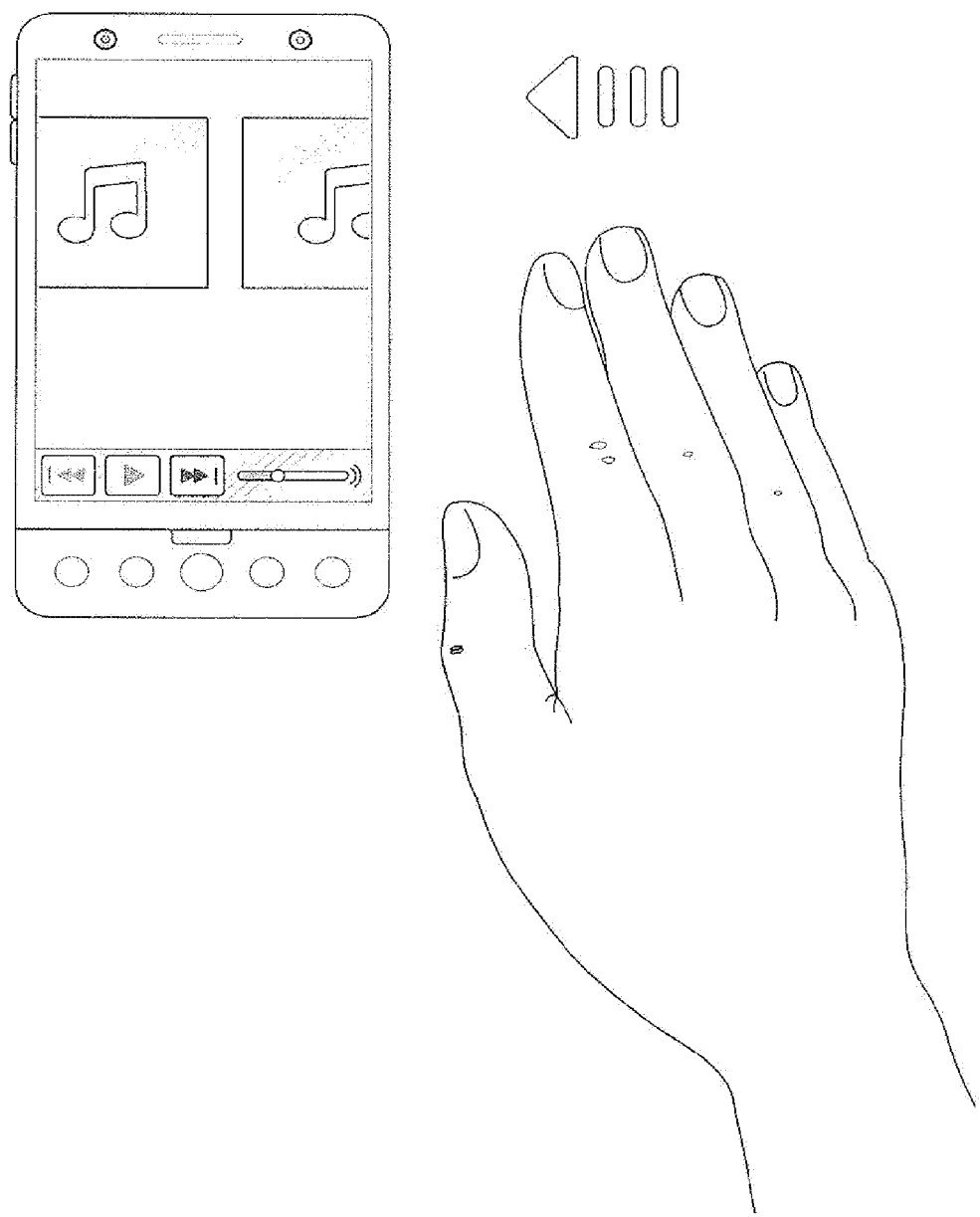
Figure 12C:
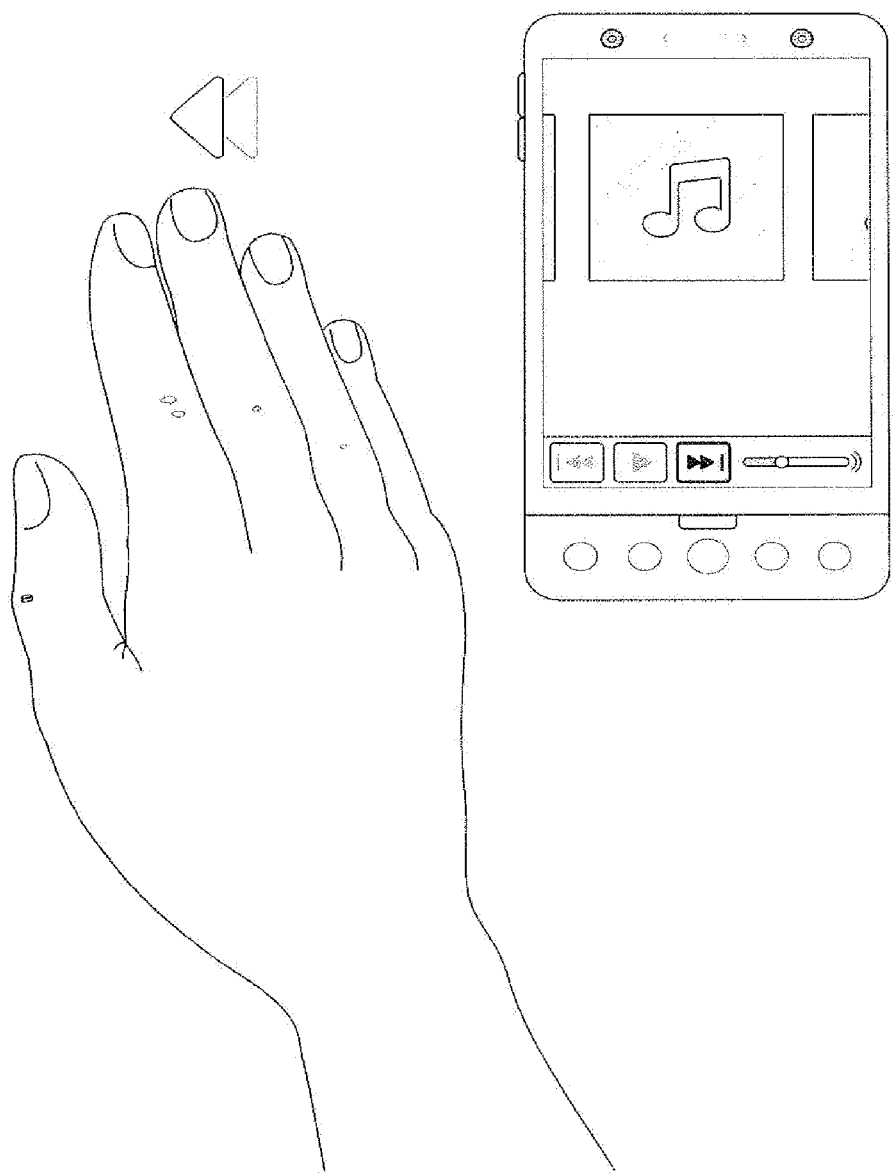
Figure 13A:
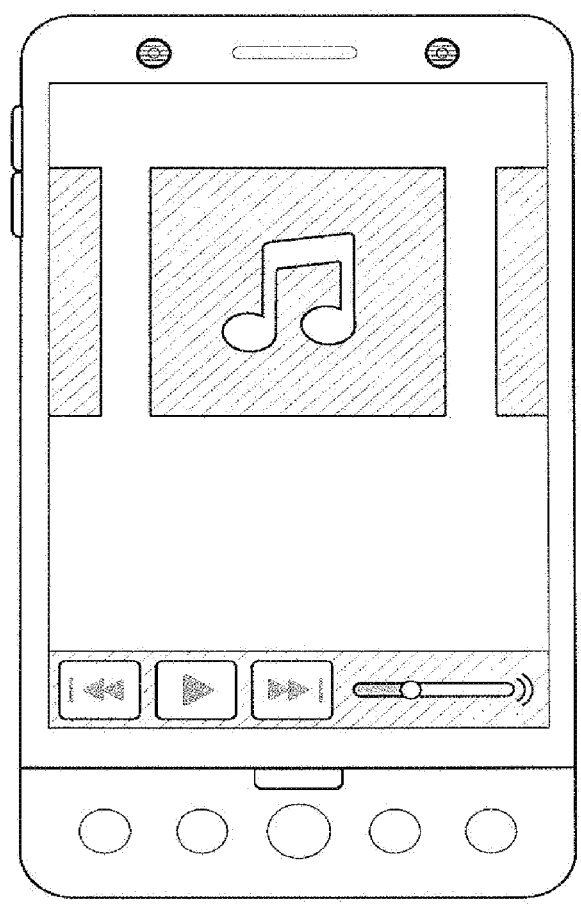
FIG. 13 illustrates a second feedback use case: a) a media player in an idle state, b) when a hand is in the vicinity, idle particles appear, c) a subtle motion gesture to the left makes the particles flow with the gesture, and d) a distinct motion gesture to the left makes the particles seem to grab onto the album art which is swept off the screen, triggering "next track"
Figure 13B:
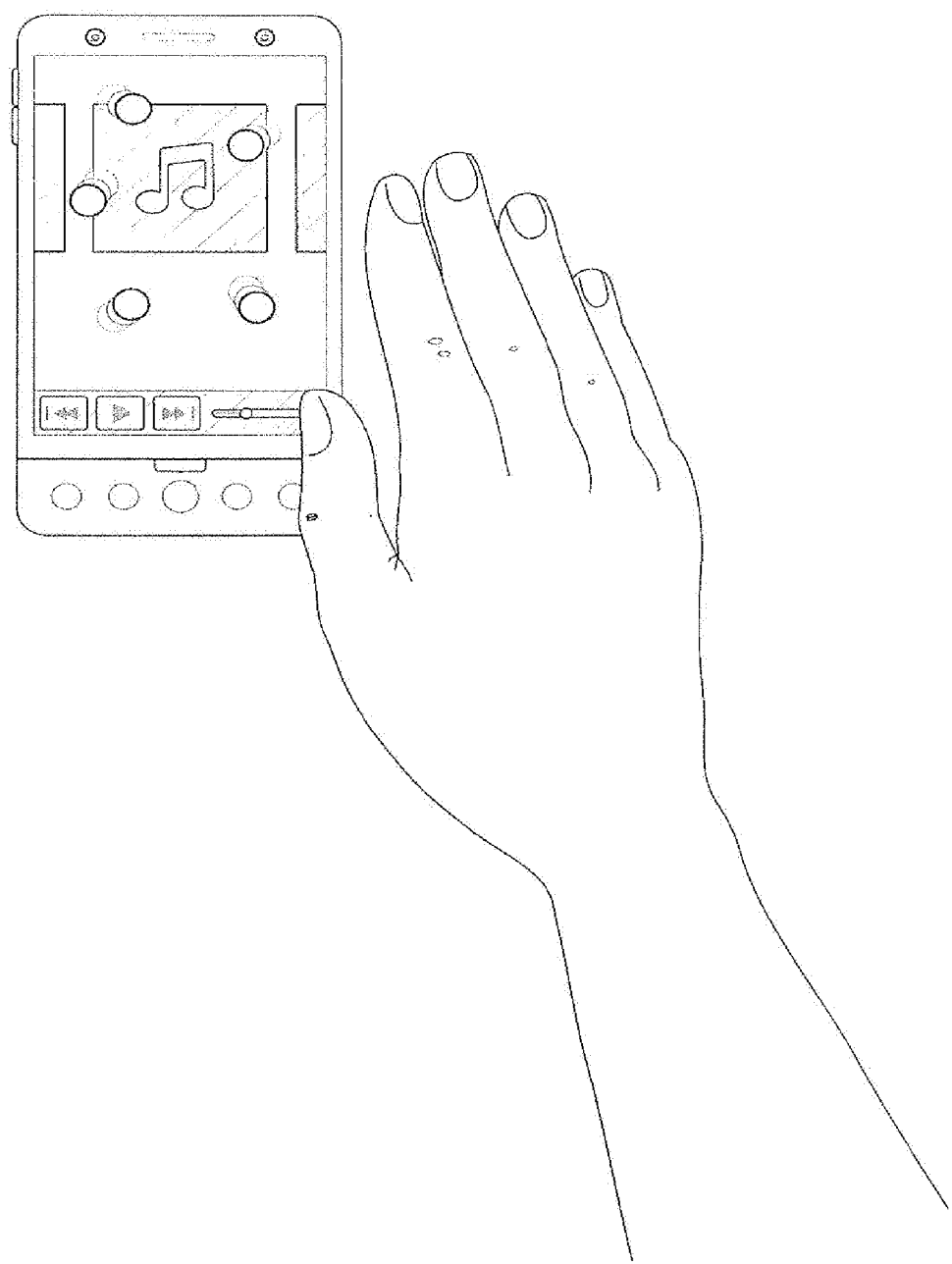
Figure 13C:
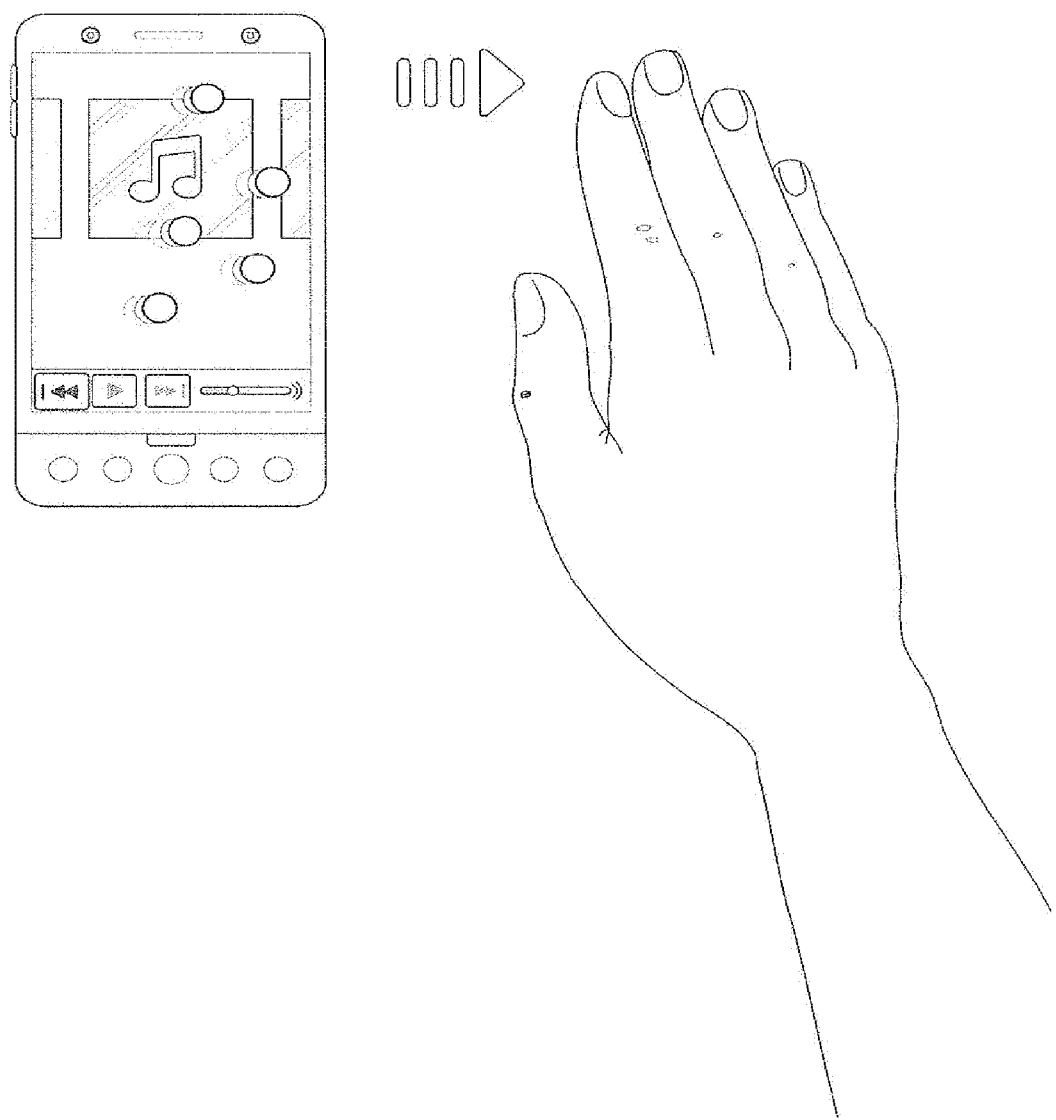
Figure 13D:
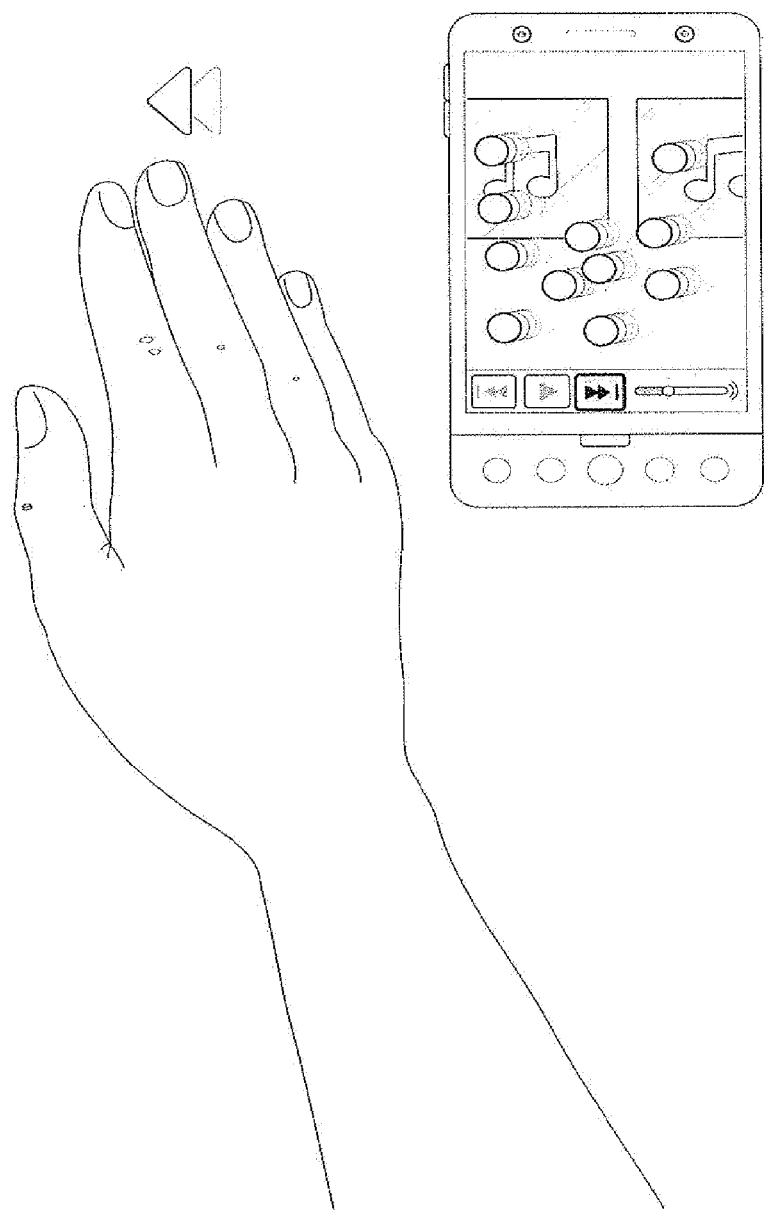
Figure 14A:
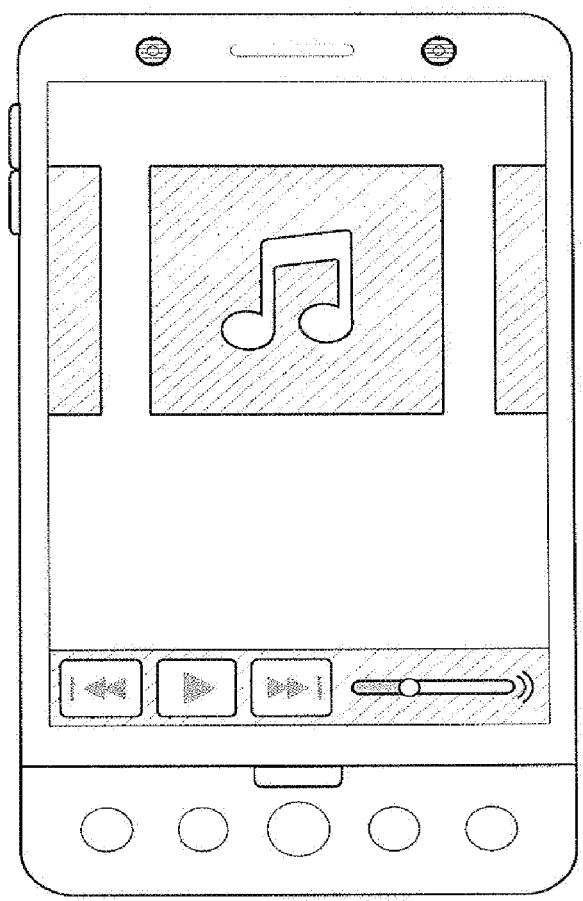
FIG. 14 illustrates a third feedback use case: a) a media player in an idle state, b) when a hand is in the vicinity, idle particles appear, c) the hand forms a pointed pose and the particles gather in a tight spot where the hand points, and d) moving the hand moves the particle spot and the underlying album art follows along as it is "grabbed" by the particles.
Figure 14B:
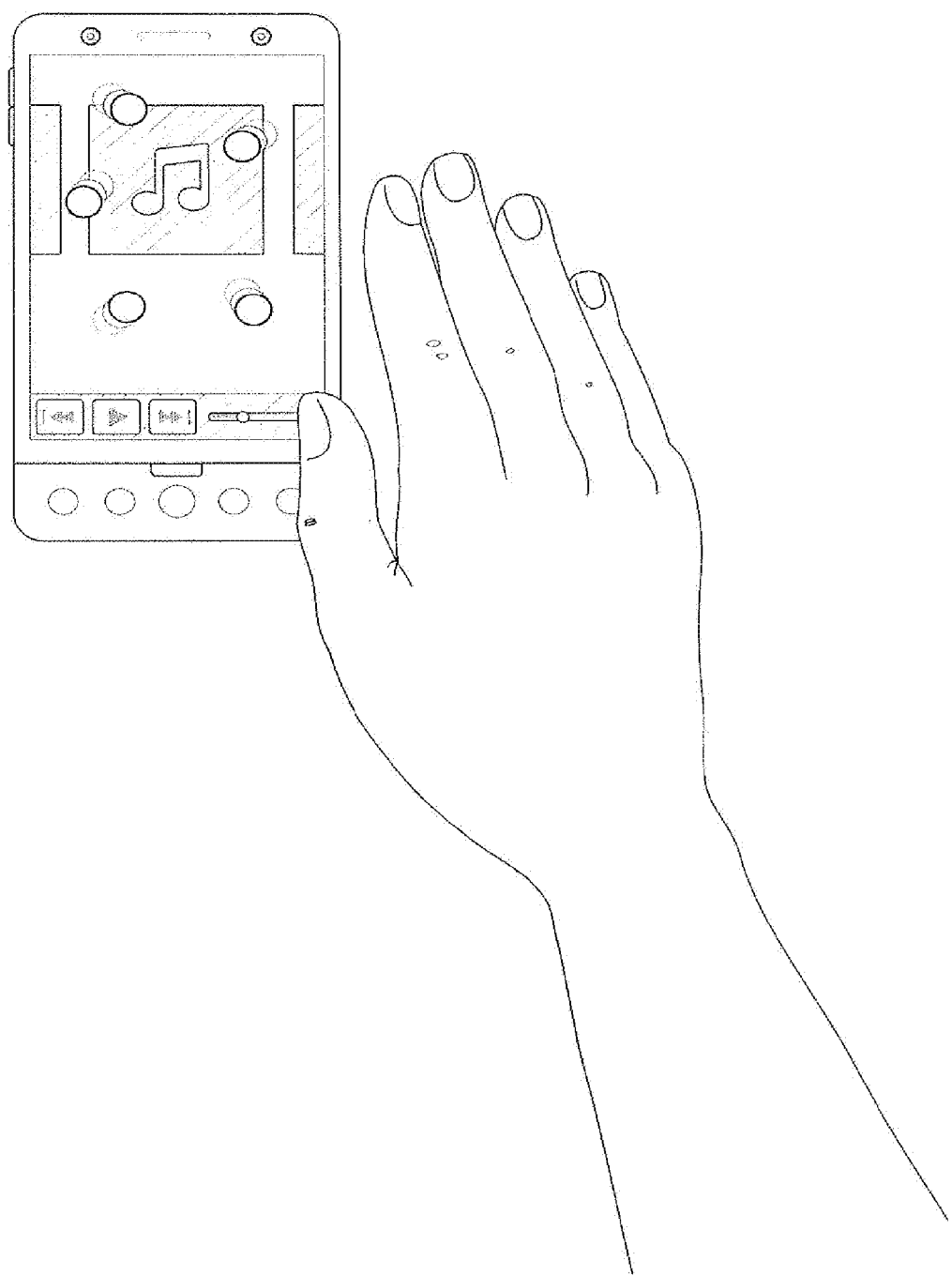
Figure 14C:
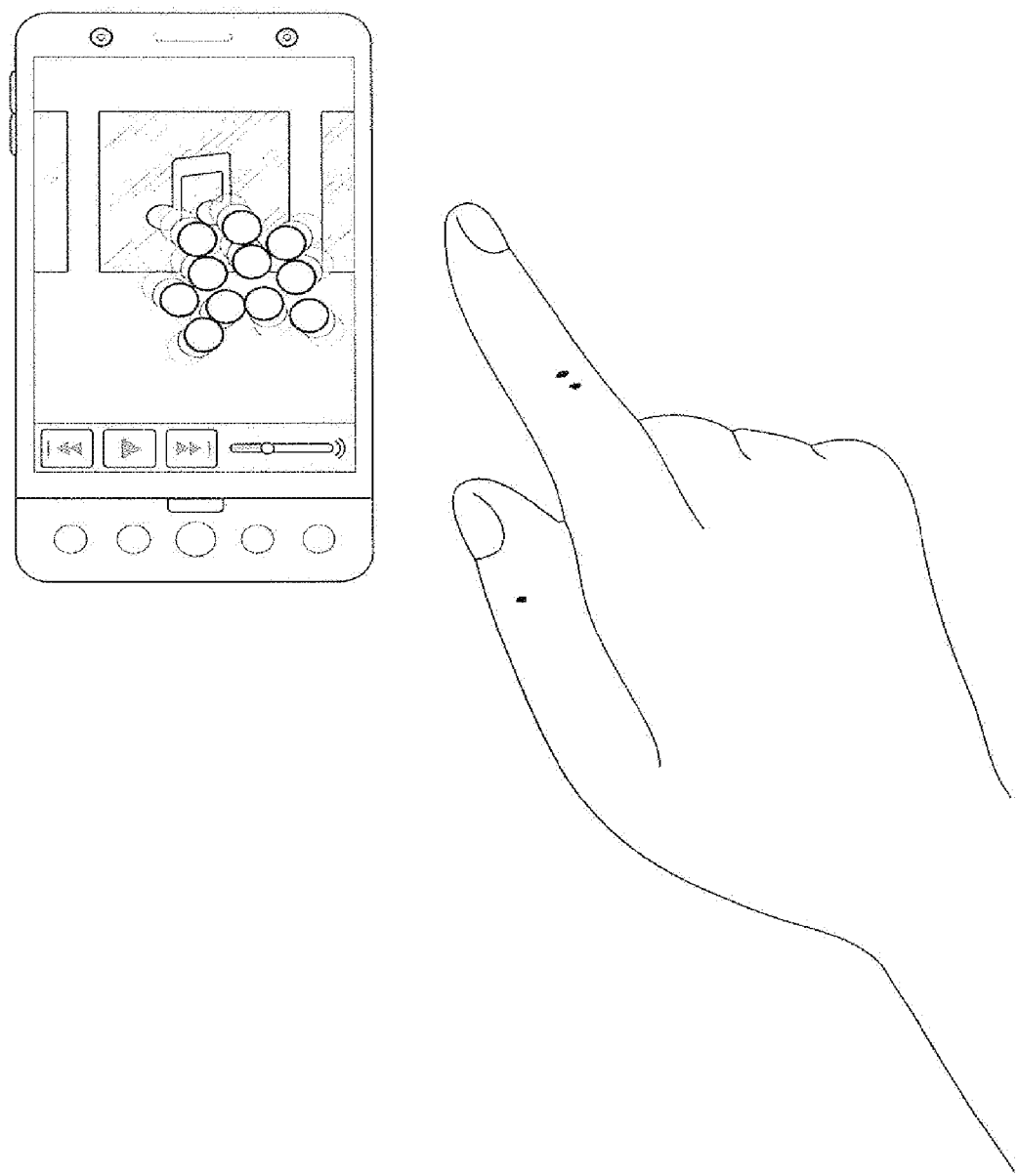
Figure 14D:
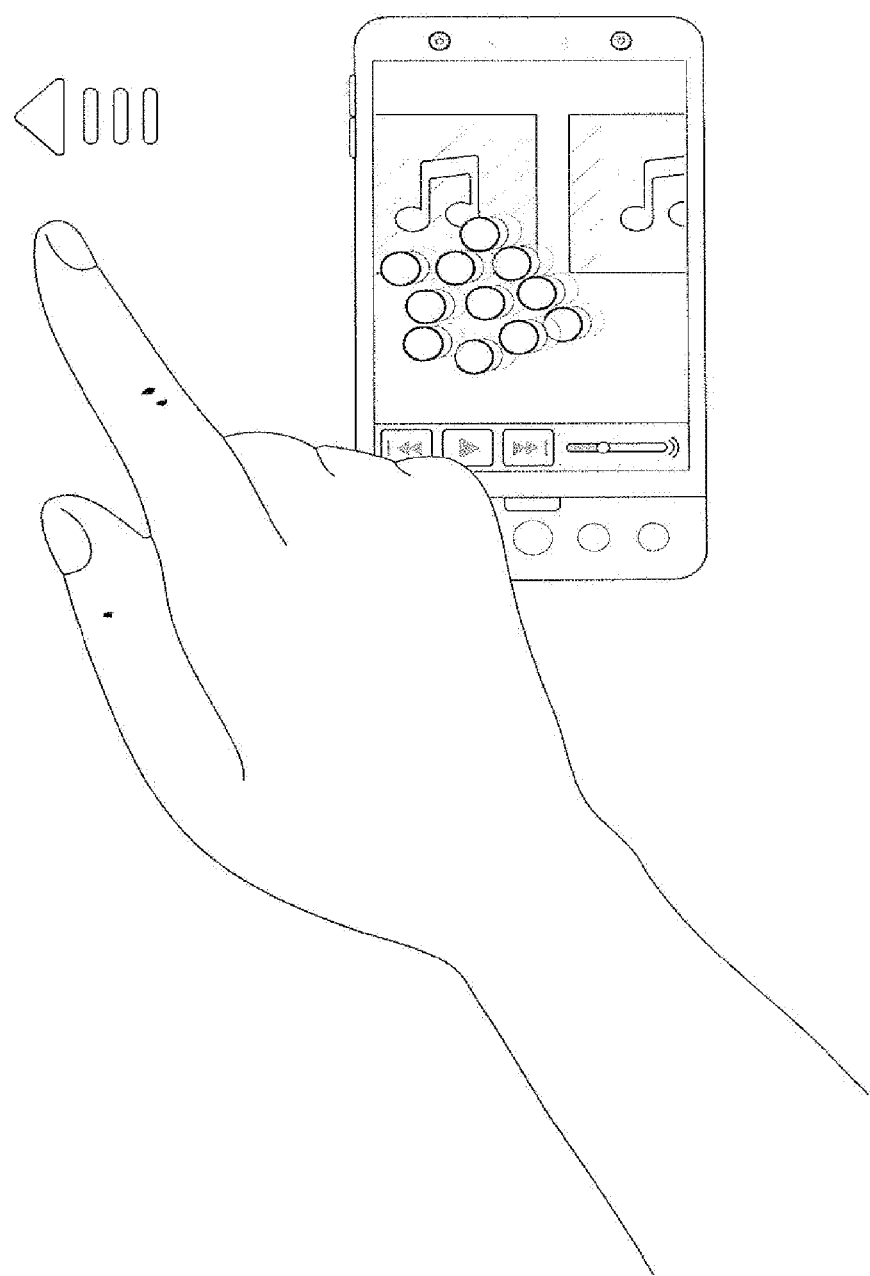
Figure 15A:
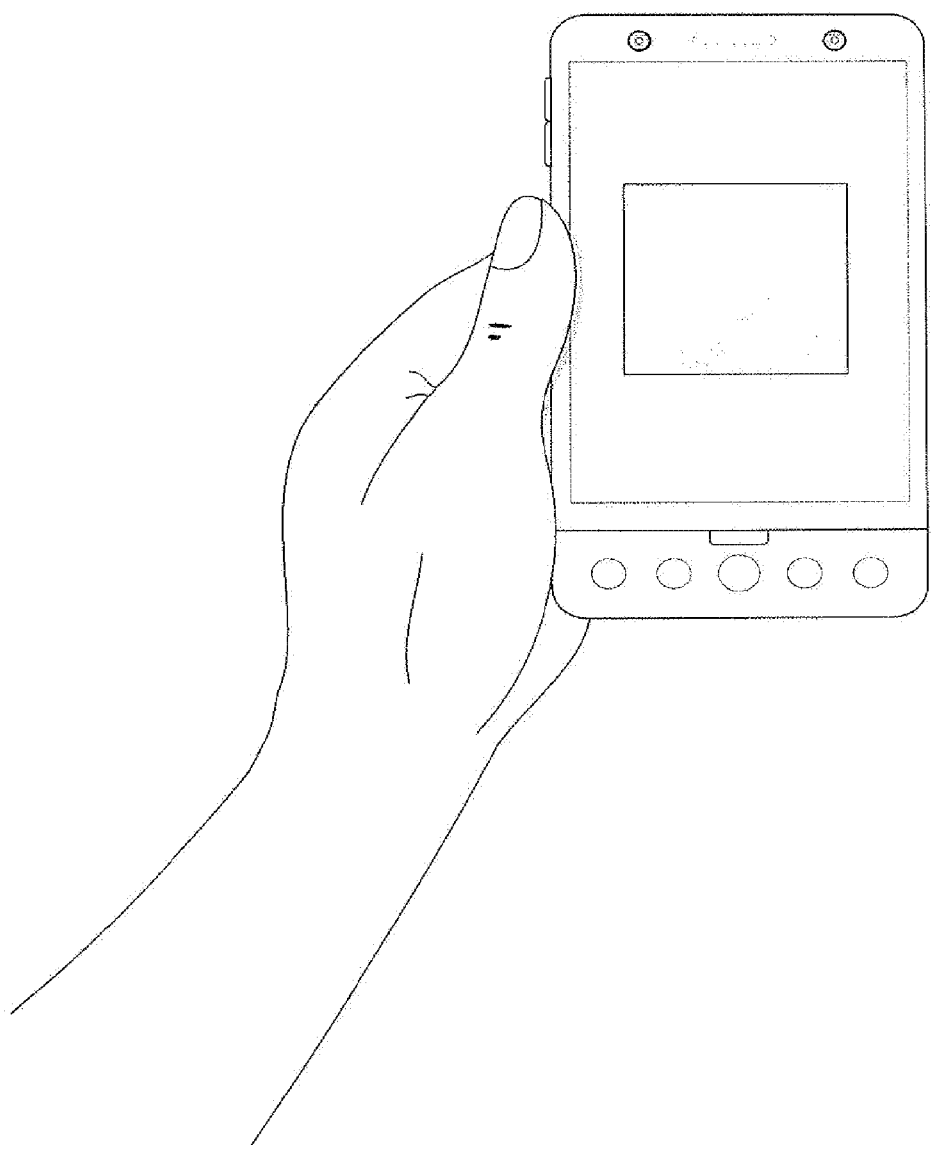
FIG. 15 illustrates a simple combination gesture: a) idle state, b) the system is not yet activated for identifying gestures, so gestures does not affect the user interface, c) activating the gesture detection system by holding a finger on the touch screen, and d) the gesture in front of the device now has effect on the user interface.
Figure 15B:
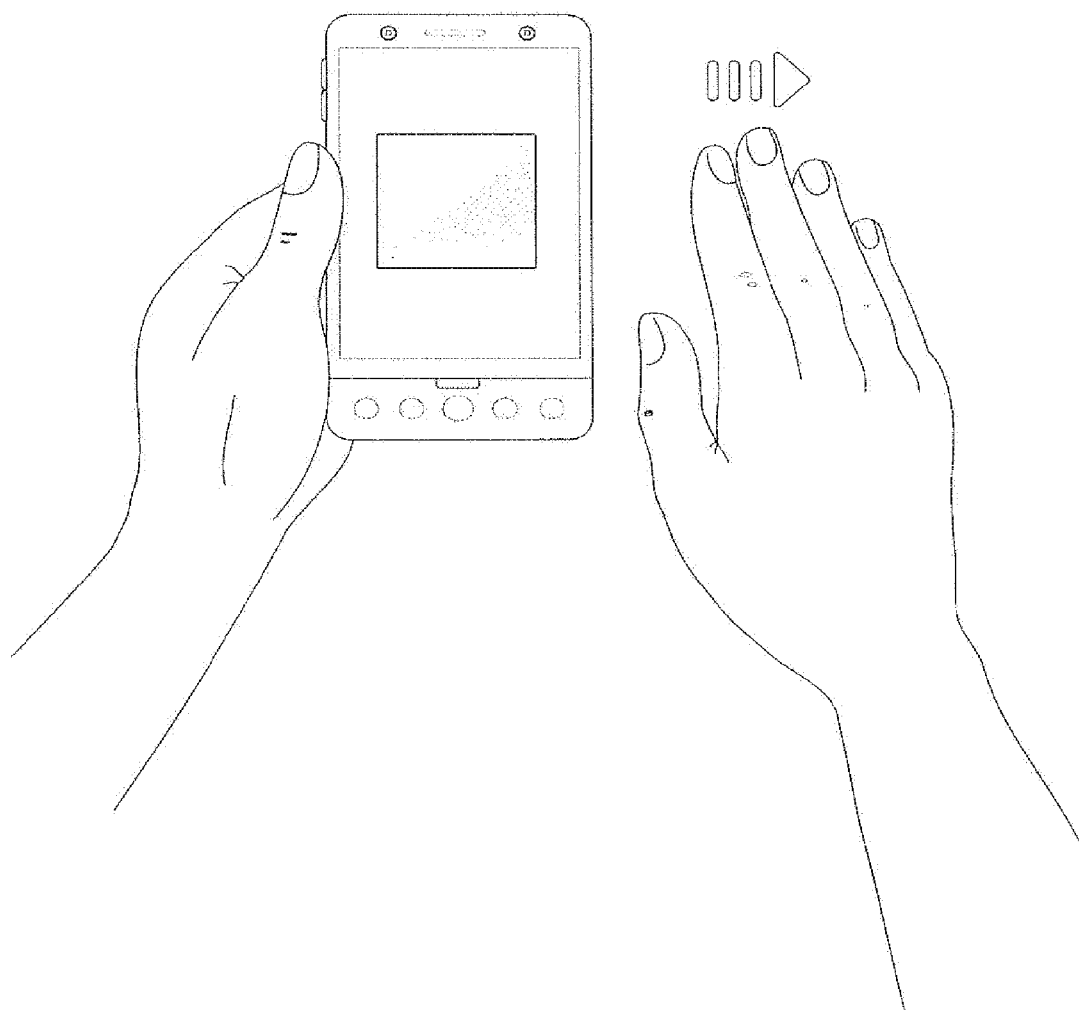
Figure 15C:
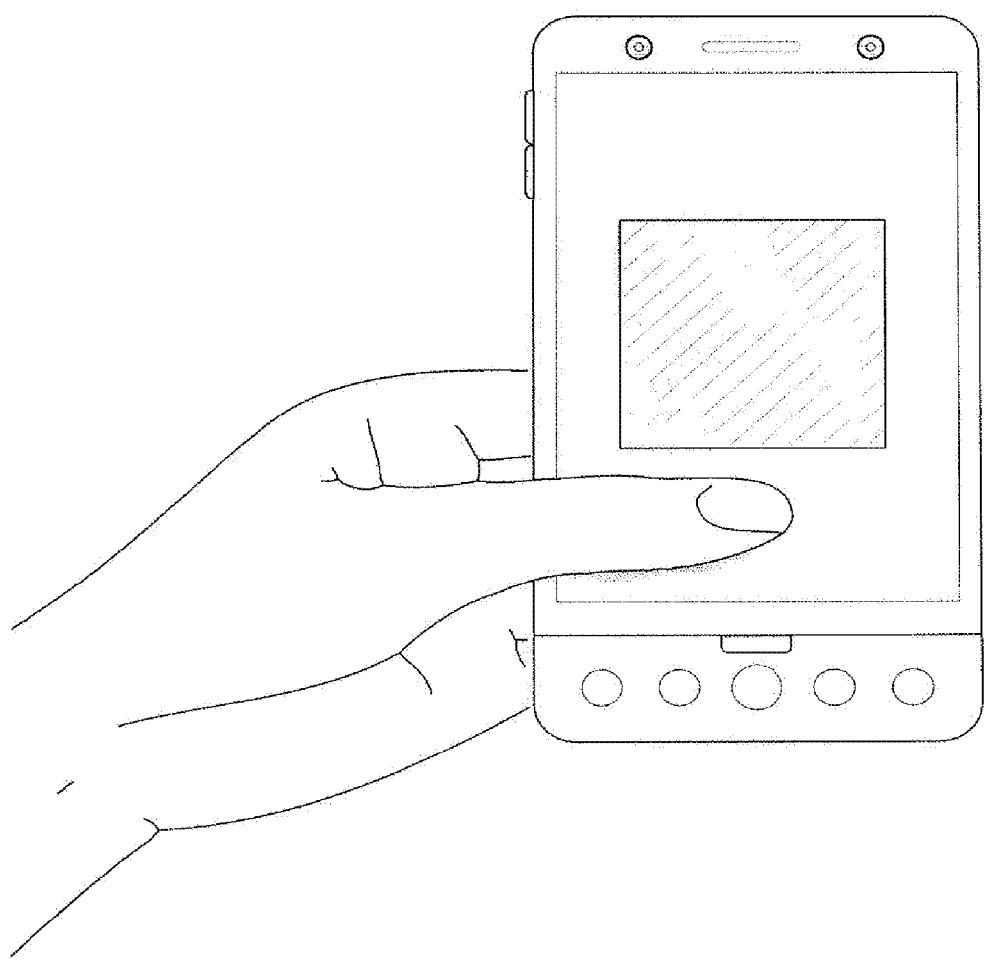
Figure 15D:
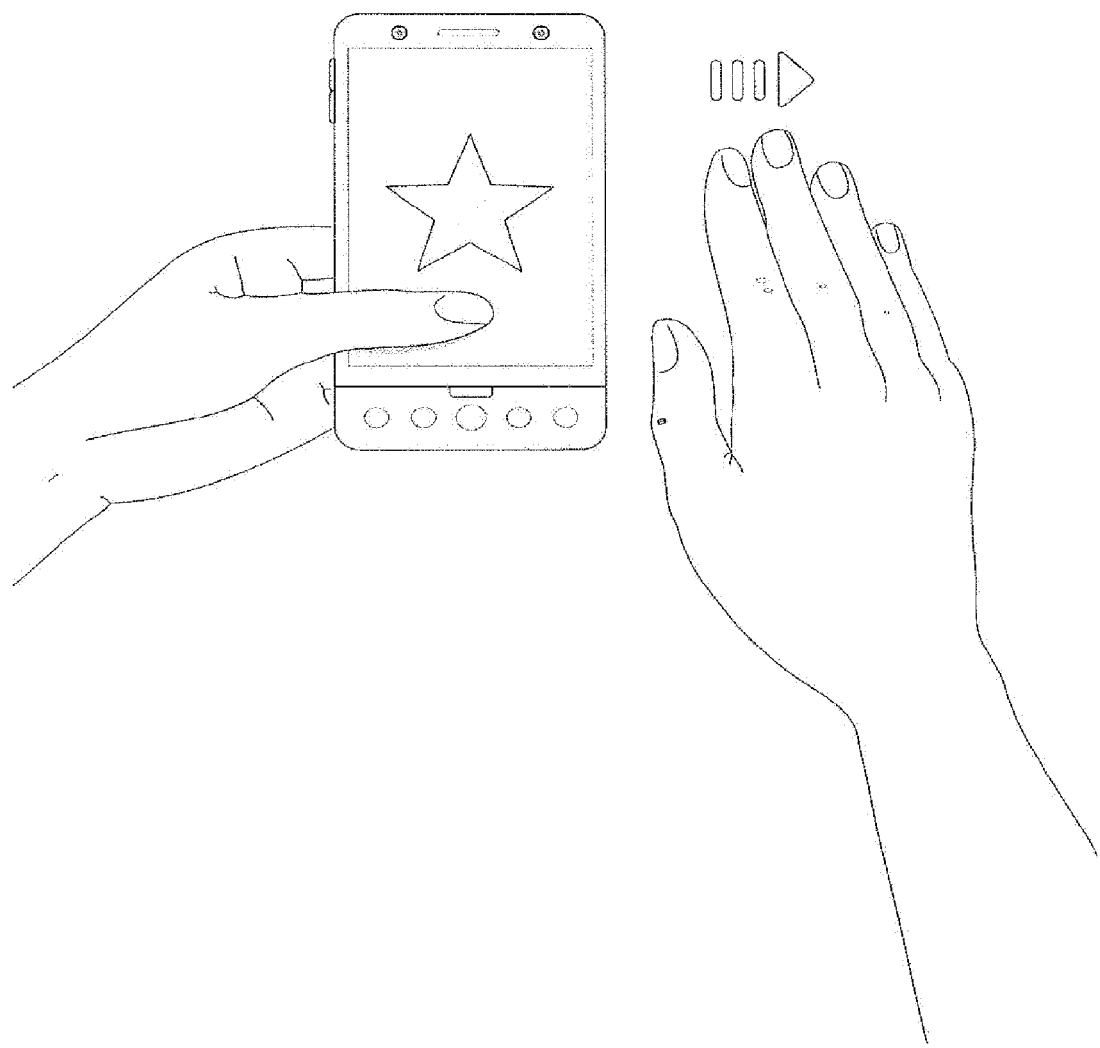
Figure 16A:
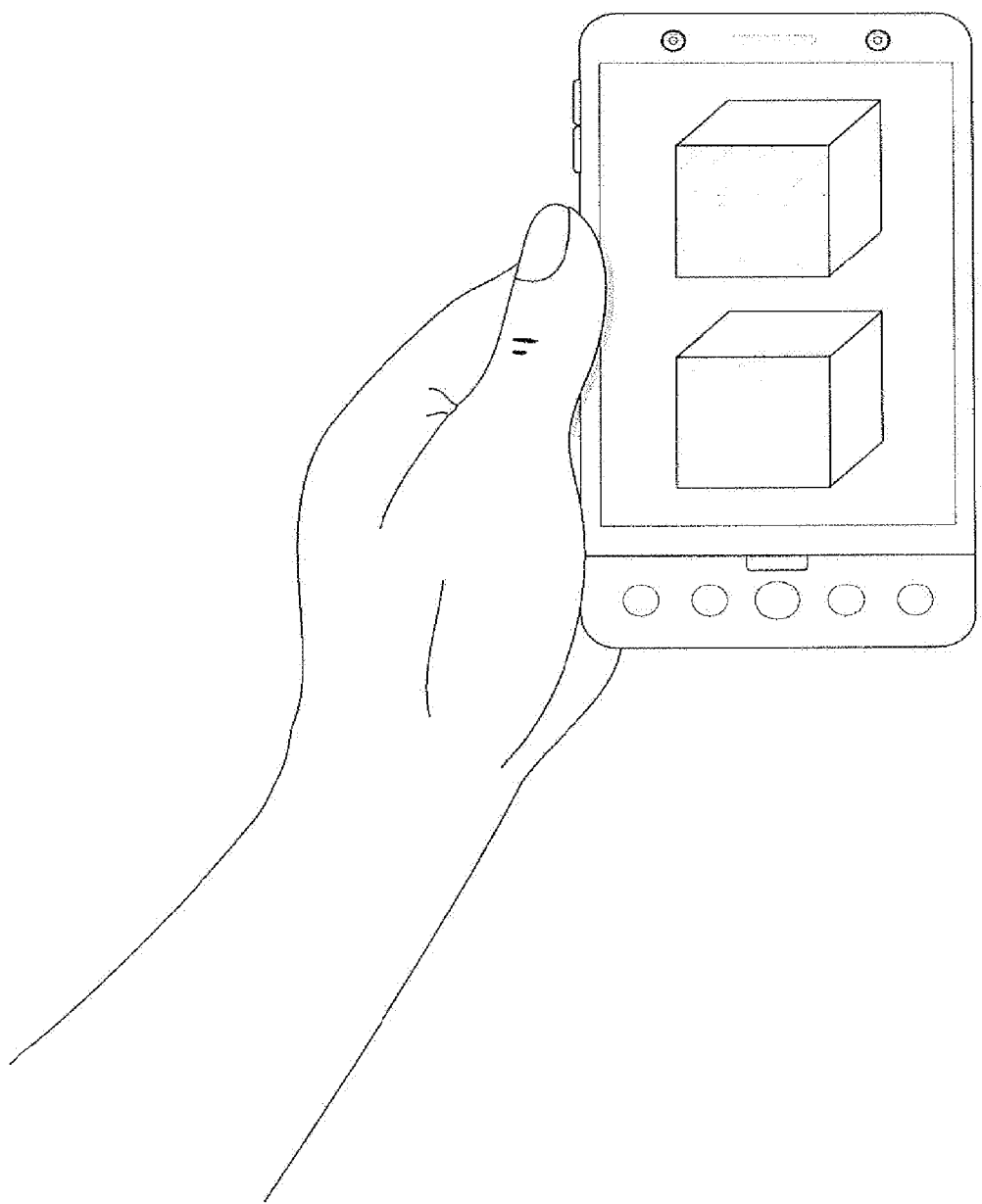
FIG. 16 illustrates another combination gesture: a) idle state showing two 3D cubes in the user interface, b) activating the gesture detection system by holding a finger on one of the cubes, c) a gesture in front of the device now affects the orientation of the selected object, and d) alternate interaction paradigm where the object held by the finger is still and the other cube is spun instead.
Figure 16B:
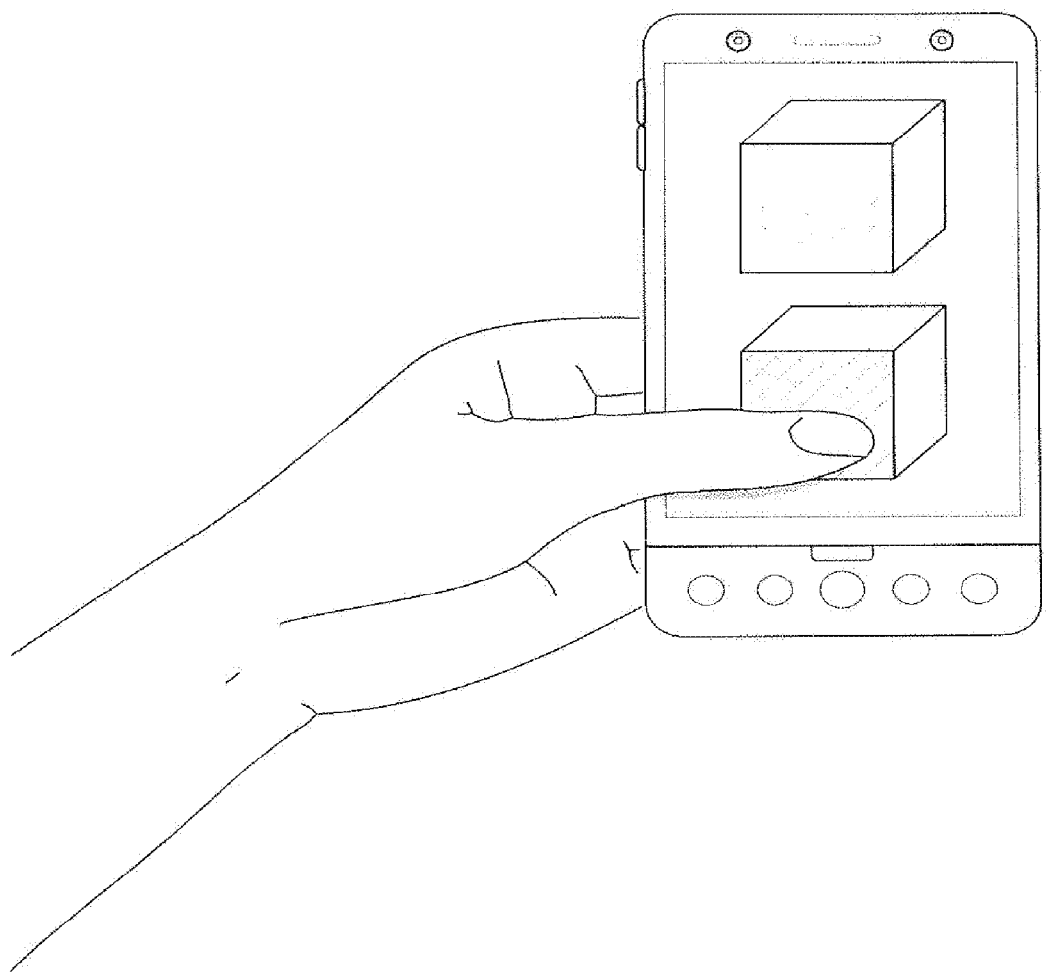
Figure 16C:
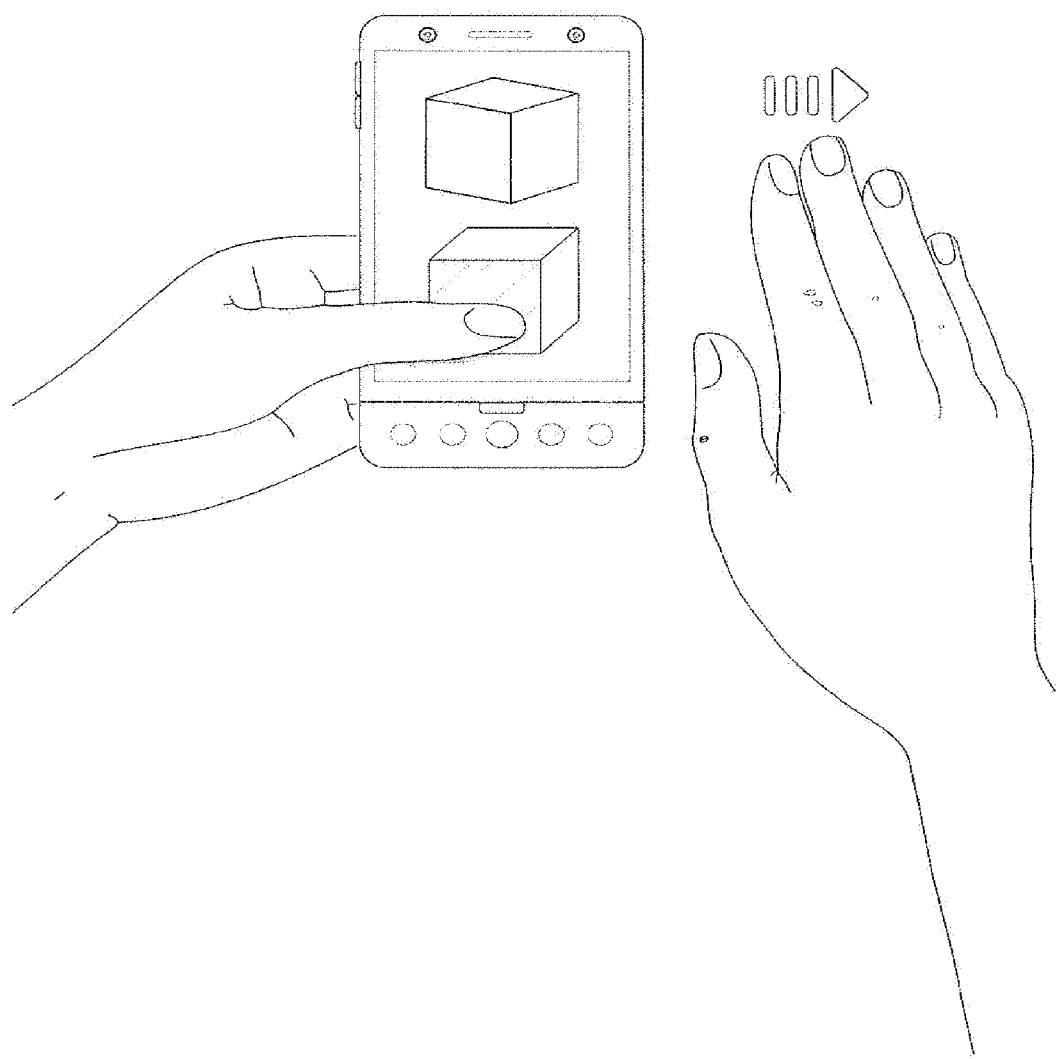
Figure 16D:
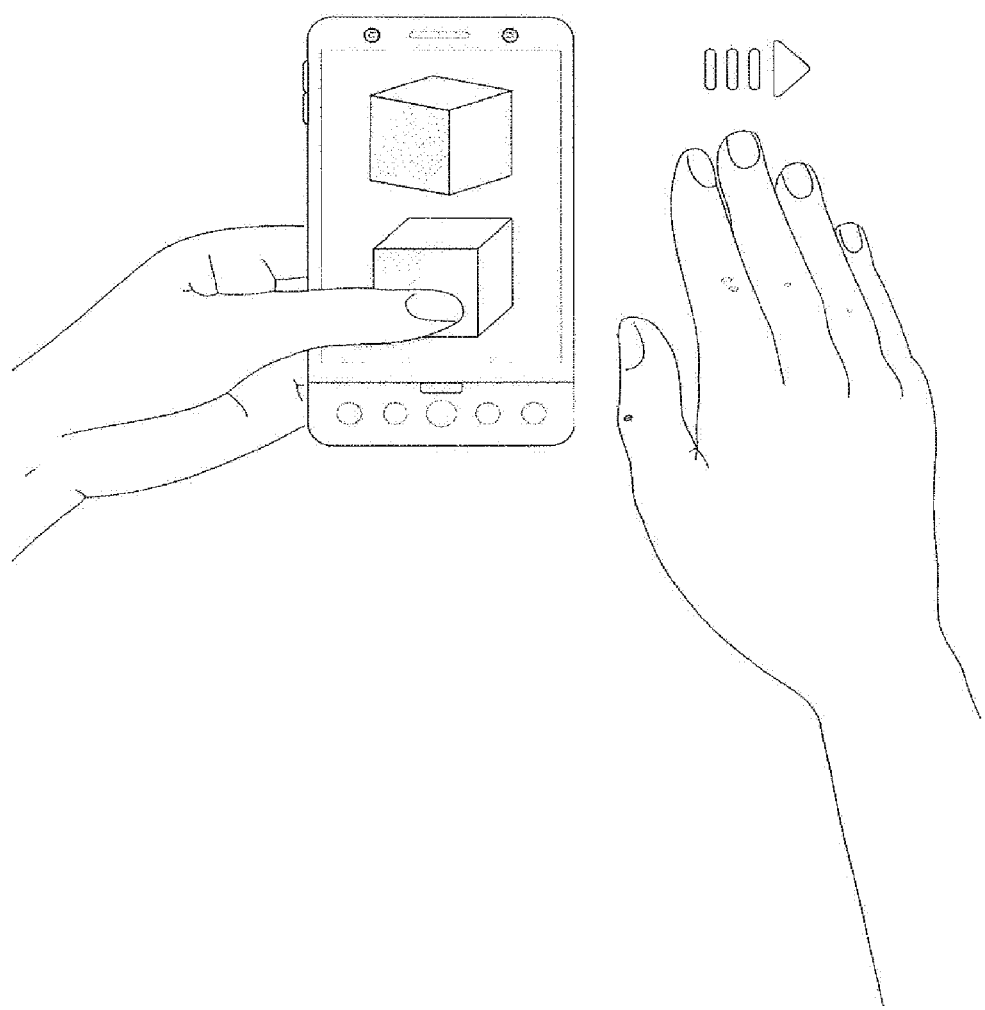
Figure 17A:
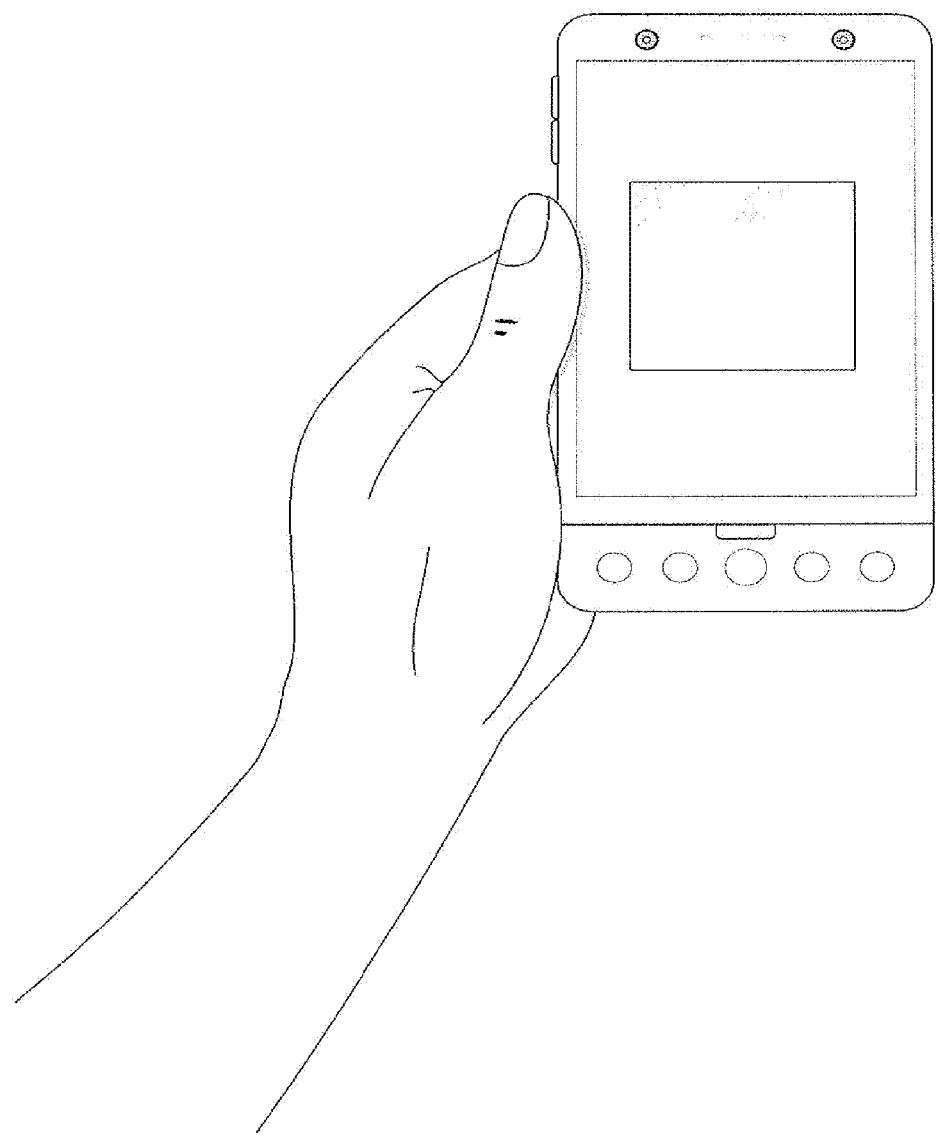
FIG. 17 illustrates another combination gesture: a) idle state, b) the system is not yet activated for identifying gestures, so gestures does not affect the user interface, c) activating the gesture detection system by holding a finger on a dedicated hardware button, and d) the gesture in front of the device has effect on the user interface while the button is pressed. In an alternate embodiment e) the gesture in front of the device has effect on the user interface as long as the button was pressed before, within a certain time limit.
Figure 17B:
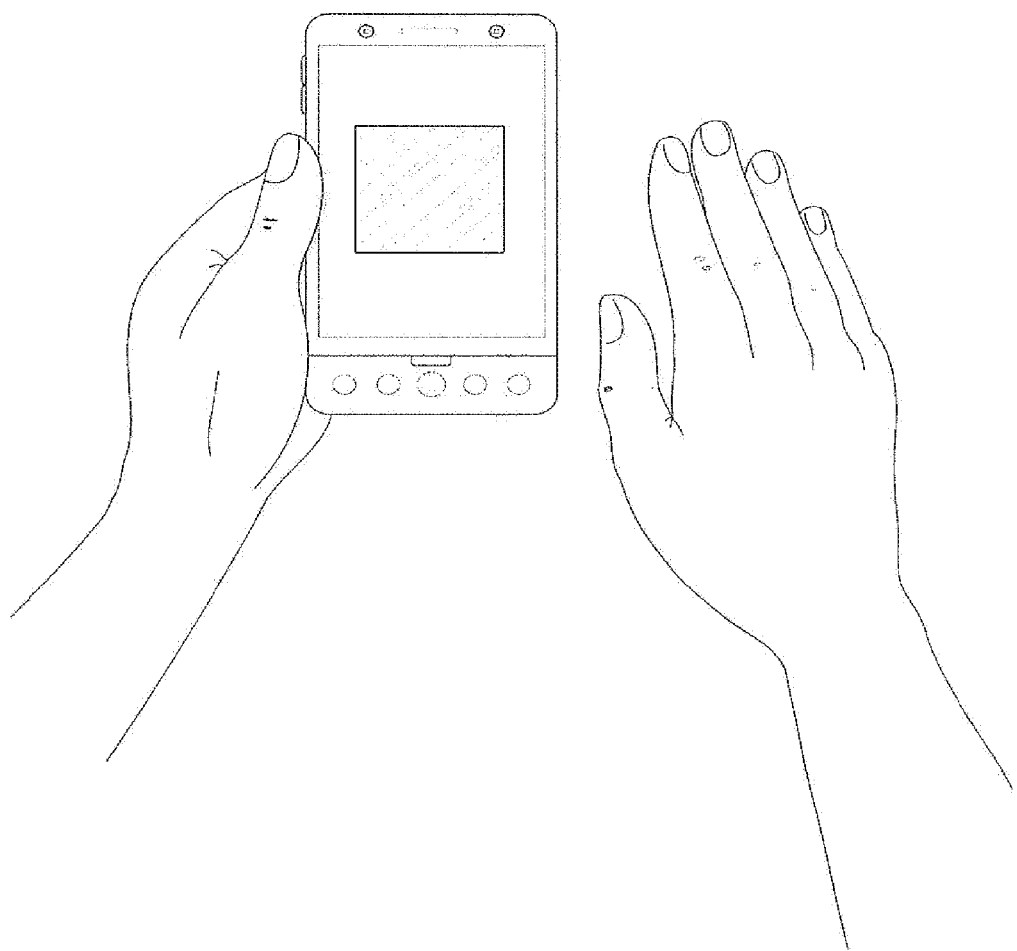
Figure 17C:
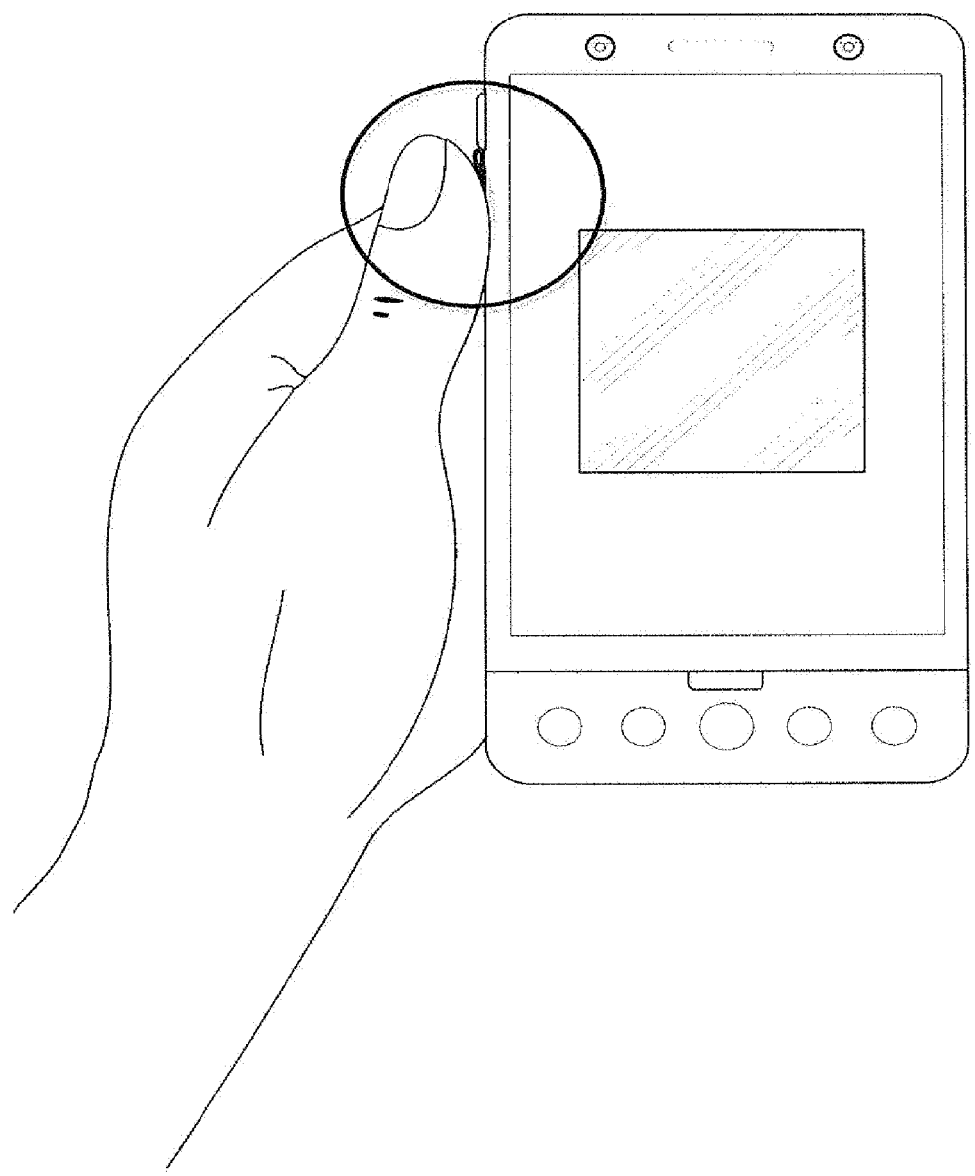
Figure 17D:
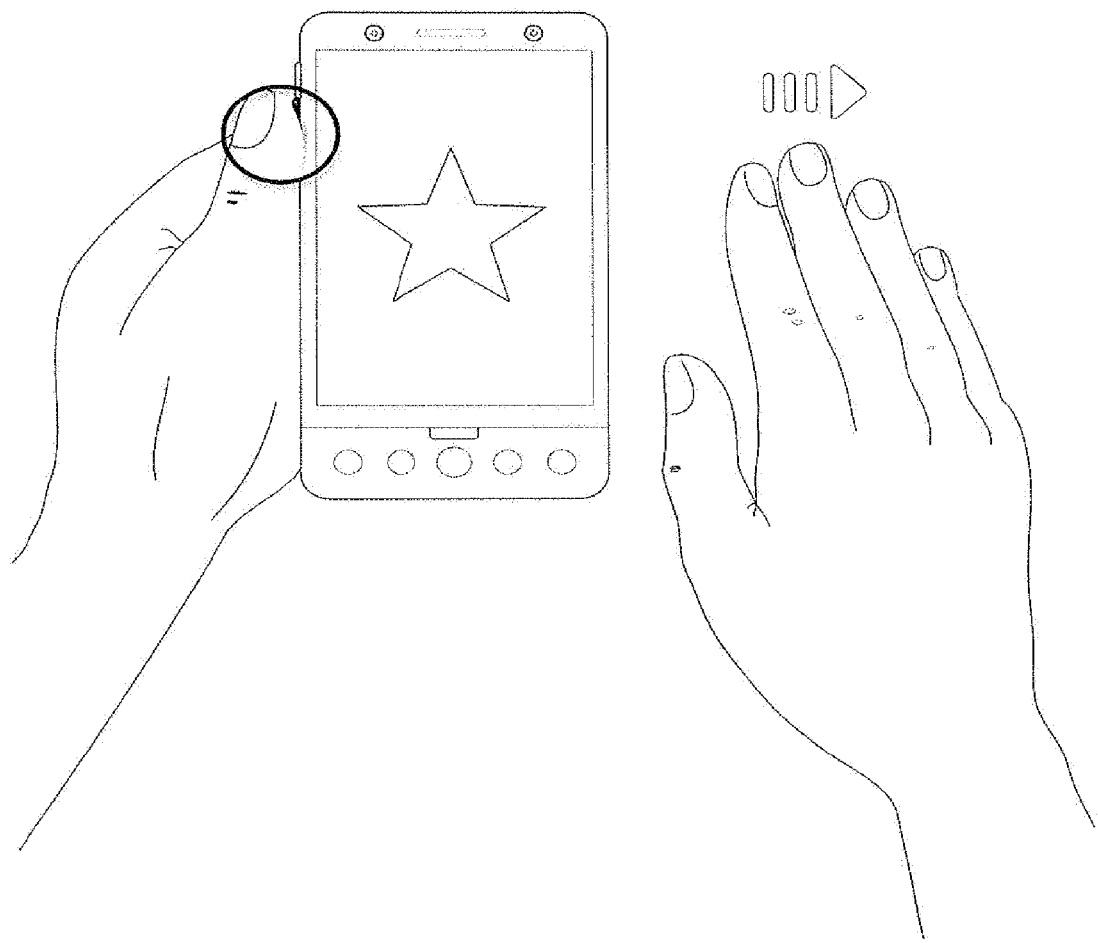
Figure 17E:
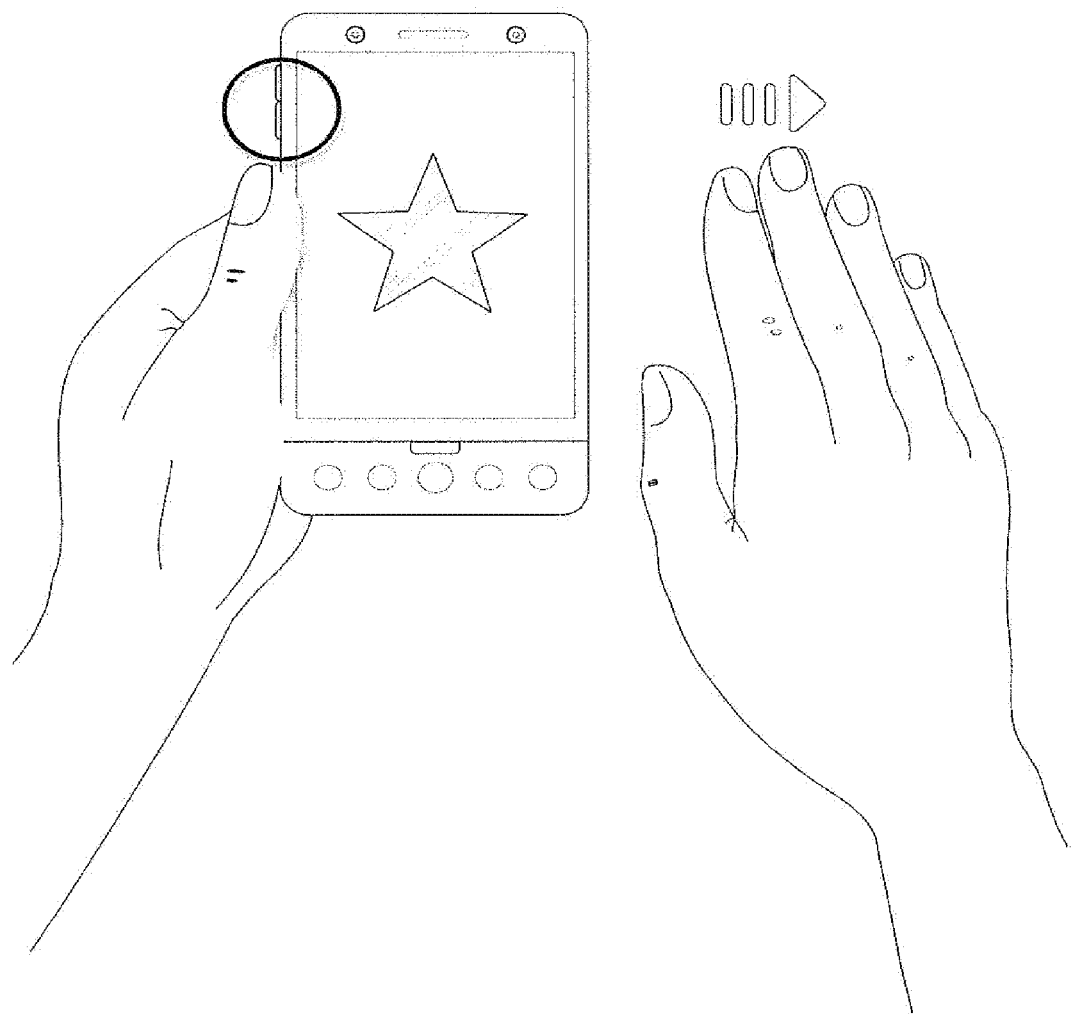

Another aspect of the proposed solution is the continuous feedback mechanism as illustrated by the different examples in FIGS. 12-14. FIG. 12 illustrates a media player use case. In 12 $a$) we see the media player in its idle state. There is album art displaying the currently playing track and there are navigation buttons at the bottom of the screen. No gesture is currently detected. In $b$) a hand has been detected and it is slowly moving to the left. The motion is not distinct enough to trigger an actual effect in the state of the media player, but subtle hints as to what this gesture means are given, including starting to move the album art to the left and slightly highlighting the "next track" button. If the gesture is discontinued, these hints fade out and the album art is restored to its original position. If as in $c$) the gesture is made stronger, i.e. more distinct, the feedback is stronger as well, with for instance a more distinctly marked "next track" button indicating that the gesture has taken effect.

Figure 5:
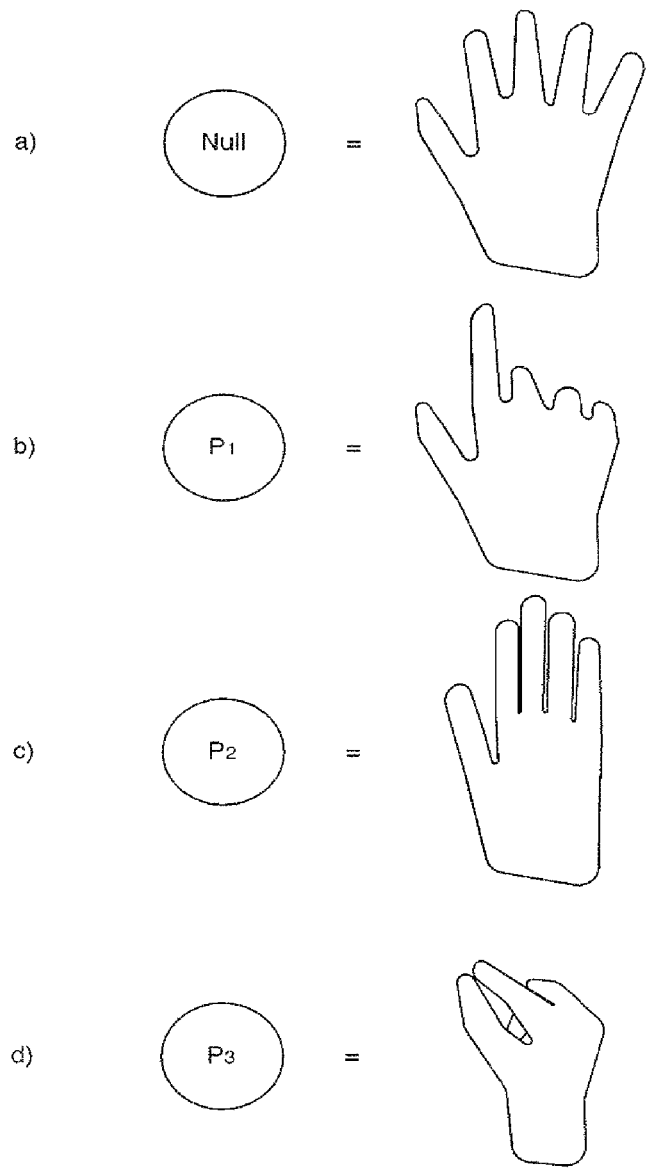
FIG. 5 a)-d) contains four example poses that can be classified
Figure 6:
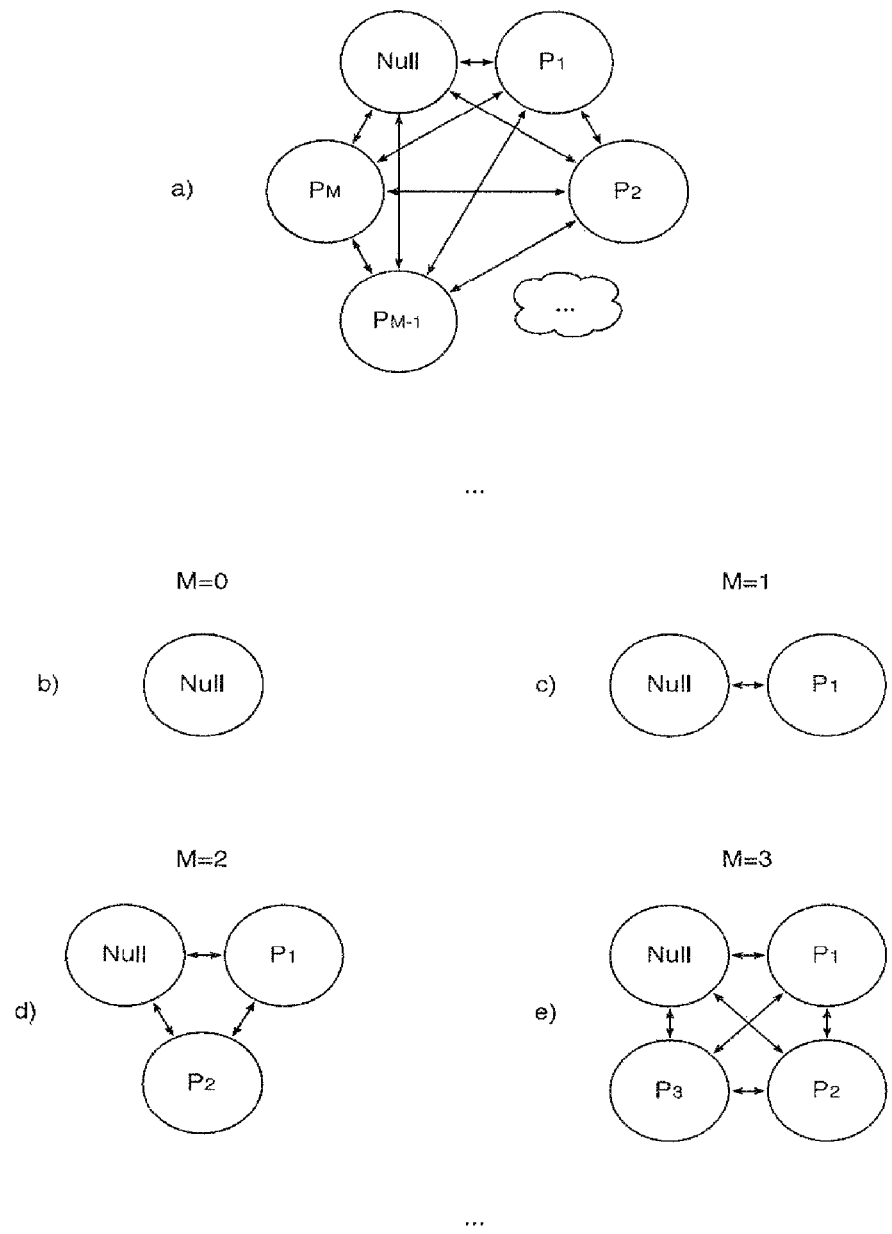
FIG. 6 a) contains a generic state transition diagram for moving between M different poses and the undefined Null pose, b)-e) contains specific state transition diagrams for M=0, M=1, M=2 and M=3 respectively.
Figure 7:
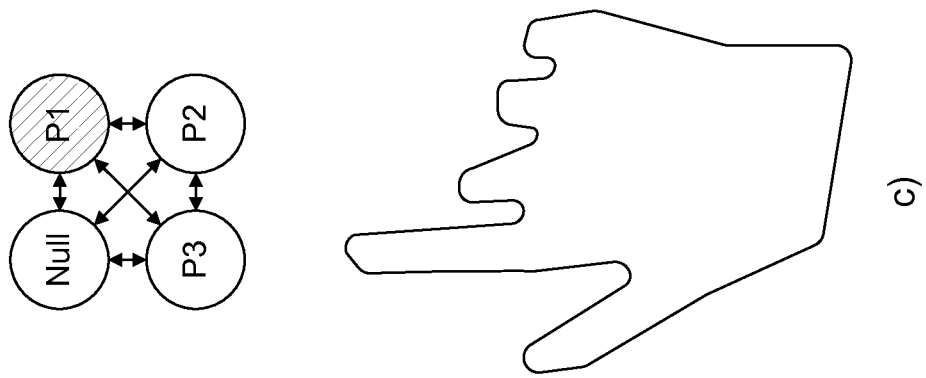
FIG. 7 shows an example object a) identified as the Null pose, b) identified as lying in between the Null pose and the P1 pose, and c) identified as the P1 pose.
Figure 7:
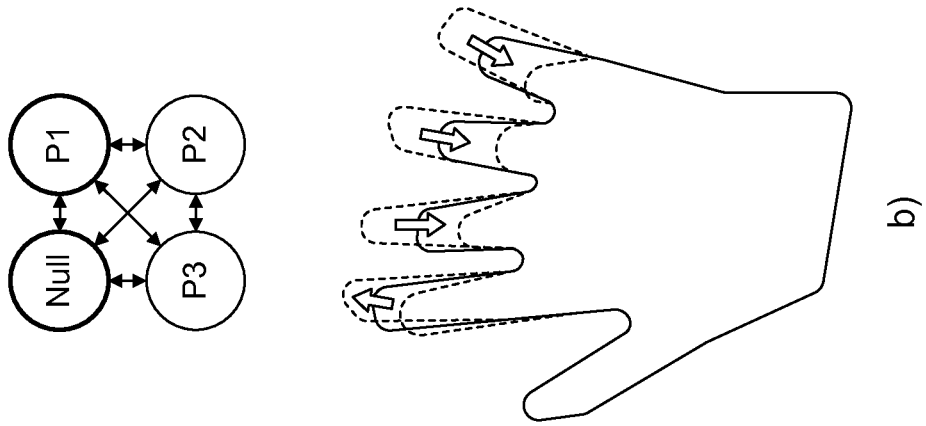
Figure 7:
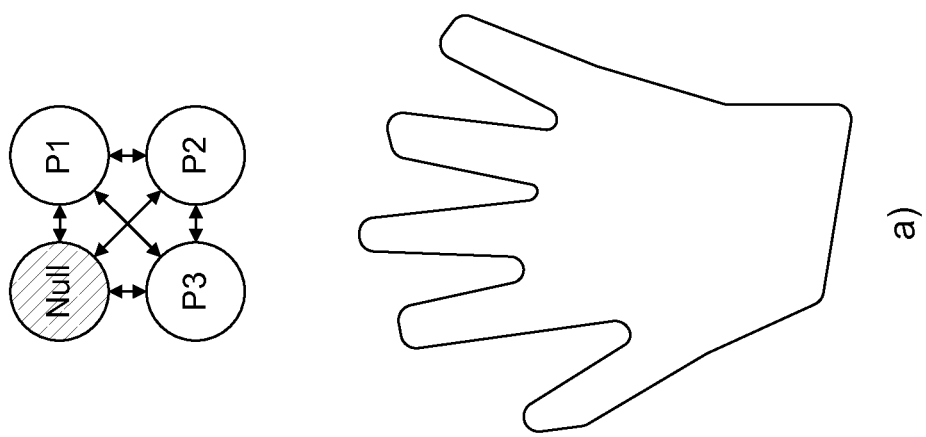
Figure 8:
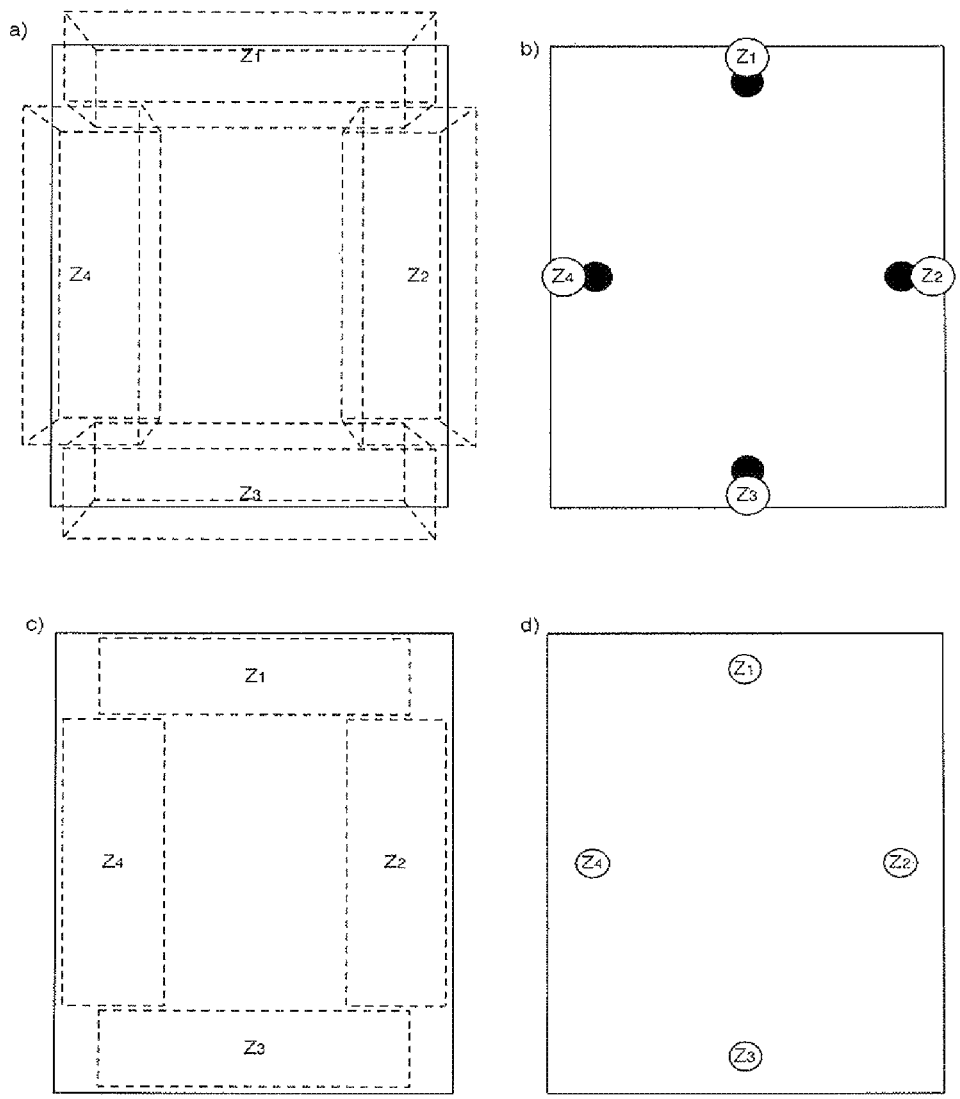
FIG. 8 shows various examples of gesture activation zones: a) 3d volumes, b) 3d points, c) 2d areas, and d) 2d points.
Figure 9:
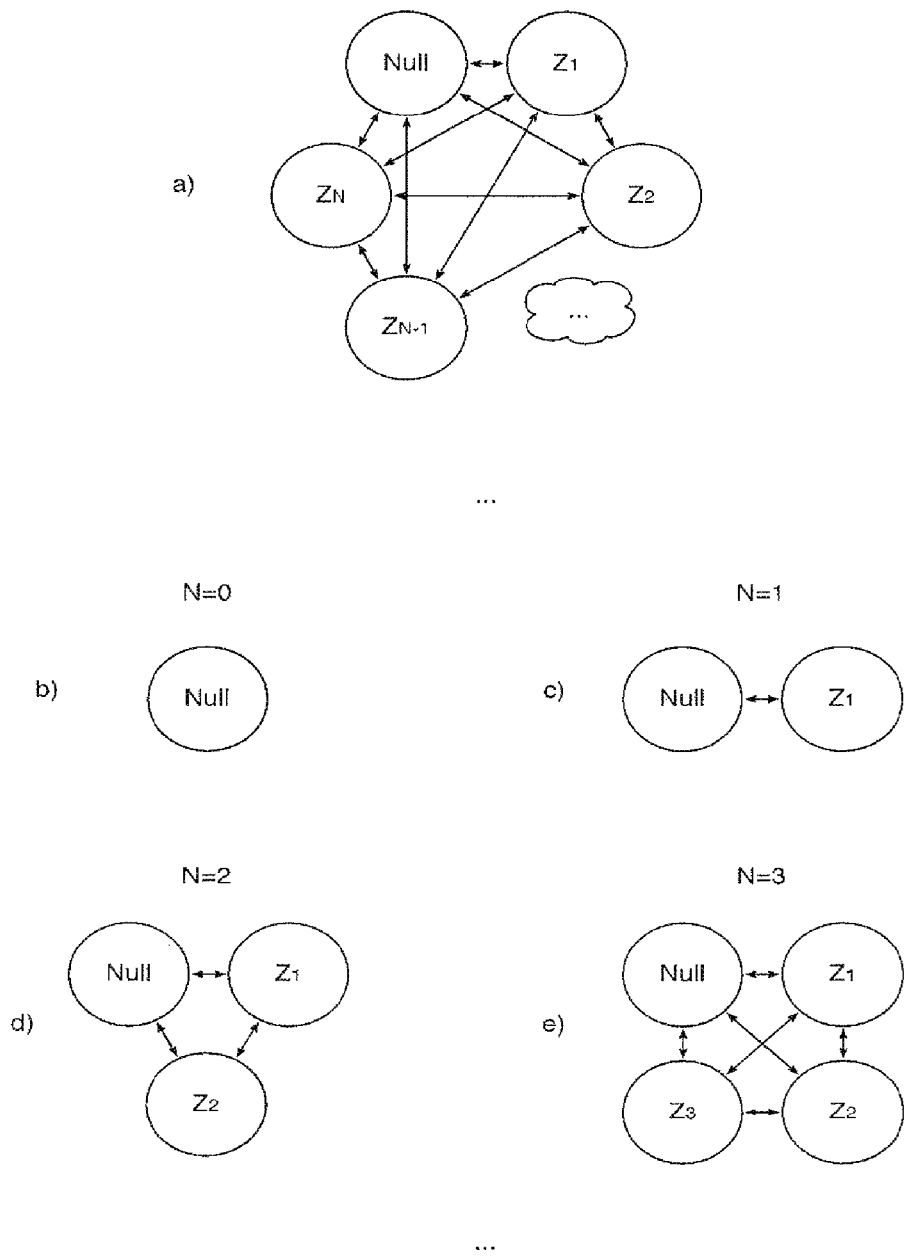
FIG. 9 a) contains a generic state transition diagram for moving between N different gesture activation zones Z and the undefined Null zone, b)-e) contains specific state transition diagrams for N=0, N=1, N=2 and N=3 respectively.
Figure 10:
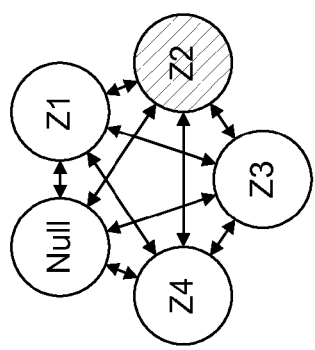
FIG. 10 shows an object determined as a) lying in the Z2 activation zone, b) lying in between zones, but heading most strongly towards the Z4 zone, and c) lying in the Z4 activation zone.
Figure 10:
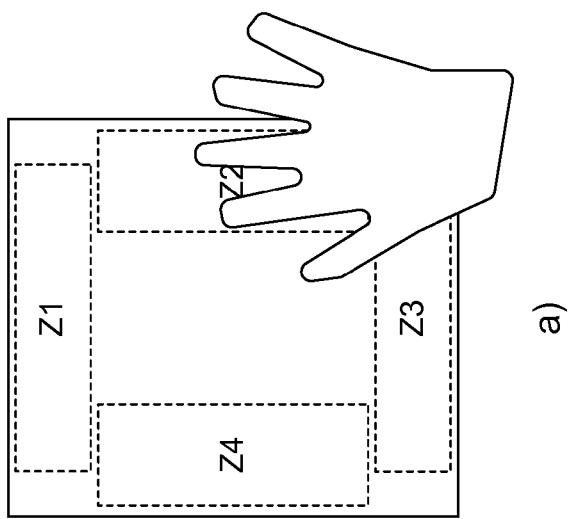
Figure 10:
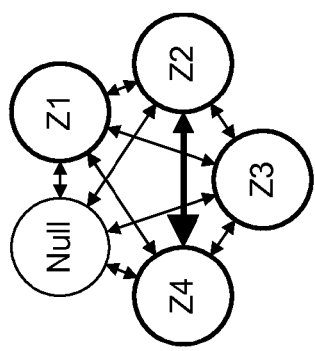
Figure 10:
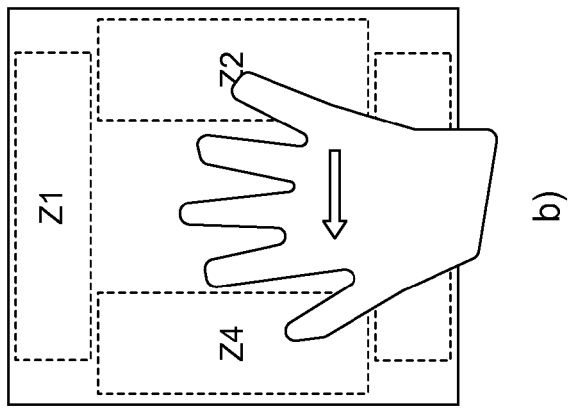
Figure 10:
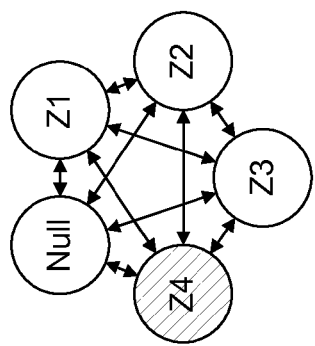
Figure 10:
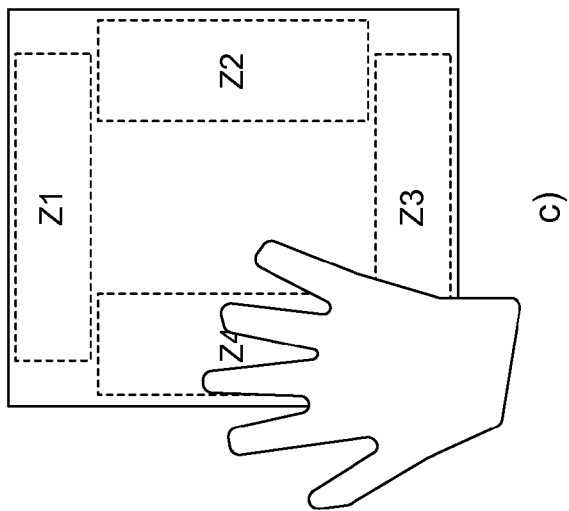
Figure 11A:
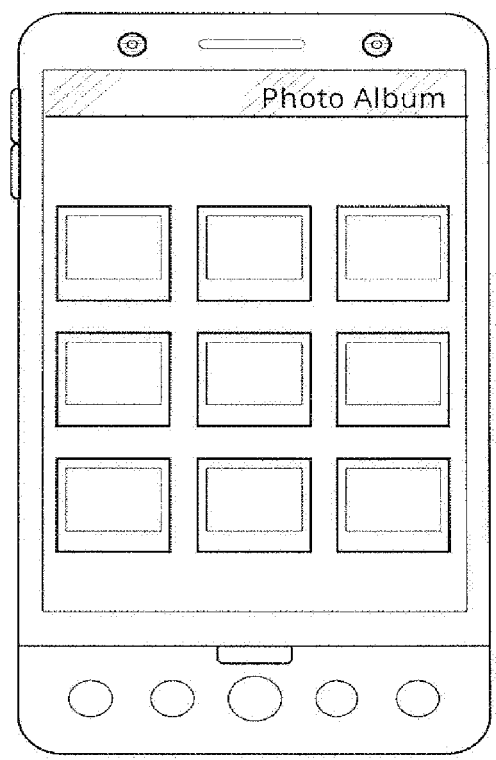
FIG. 11 illustrates a use case where a gesture starts on the touch screen (a-c) and is continued in front of the device (d-f), finishing with touch screen interaction. (g)
Figure 11B:
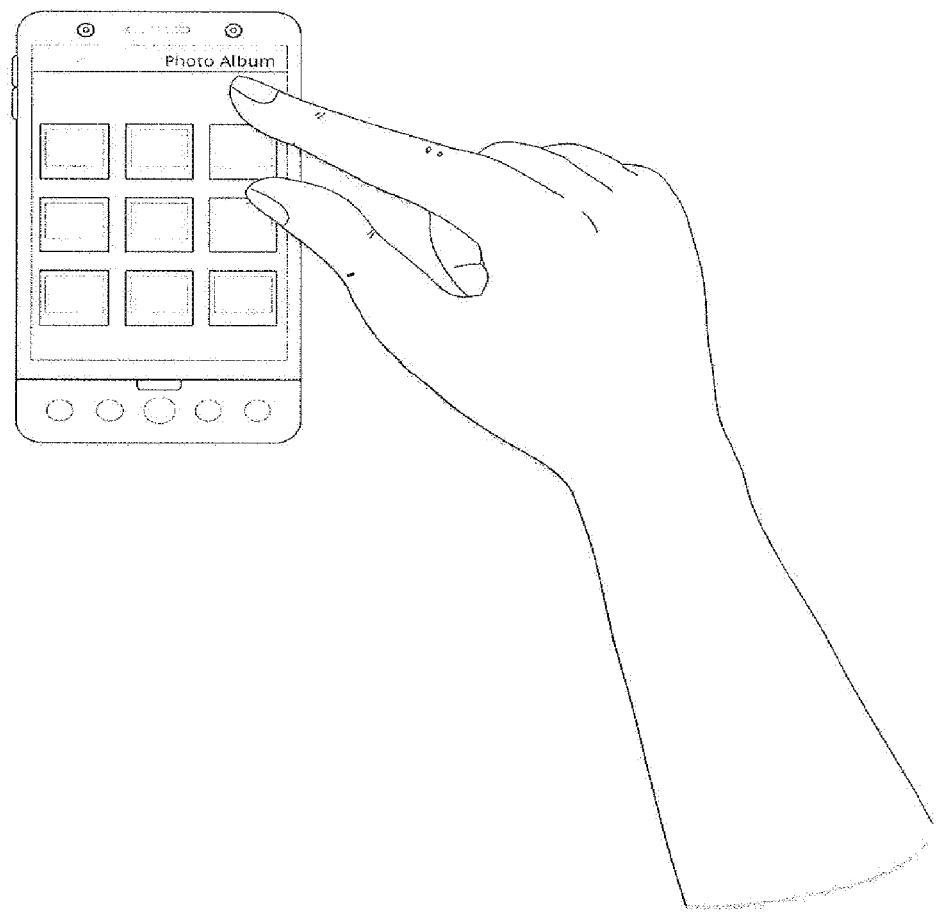
Figure 11C:
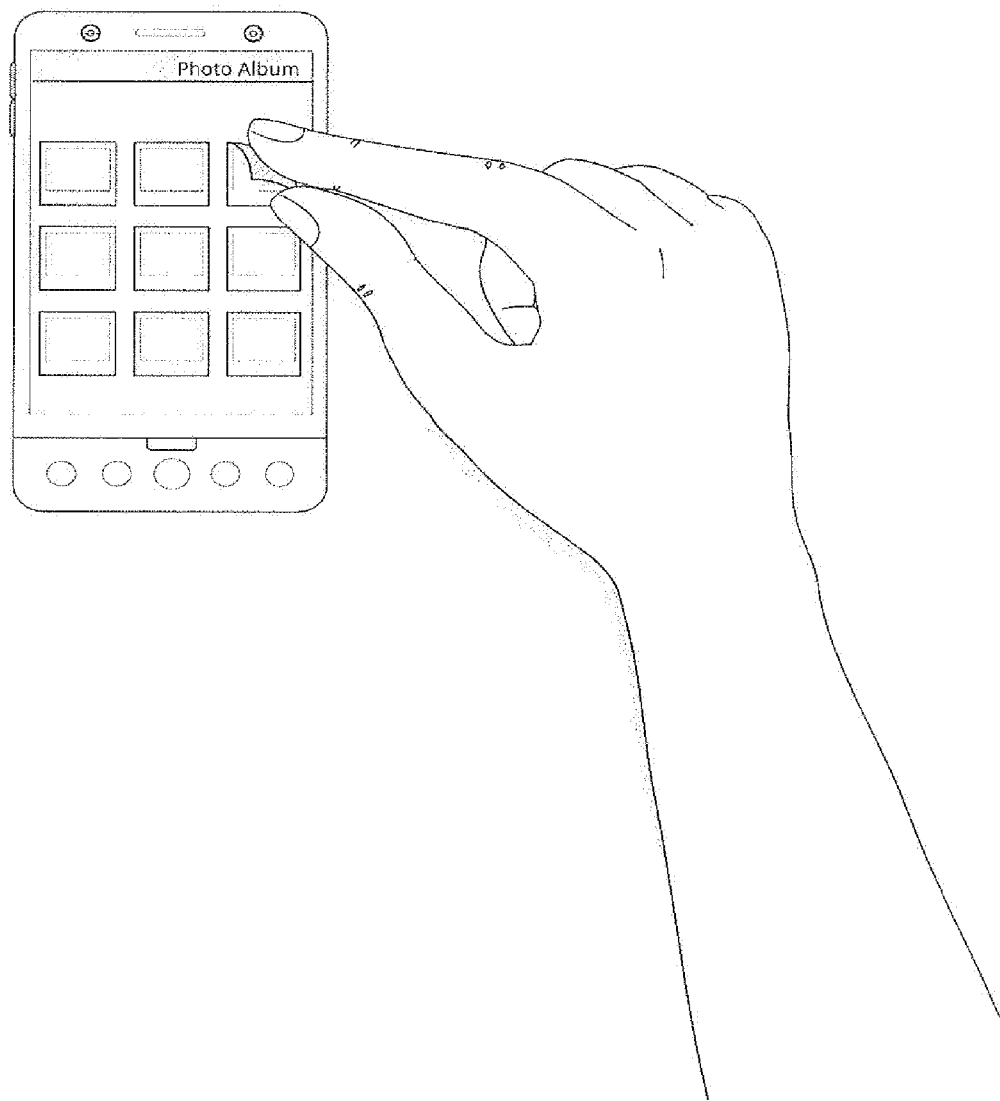
Figure 11D:
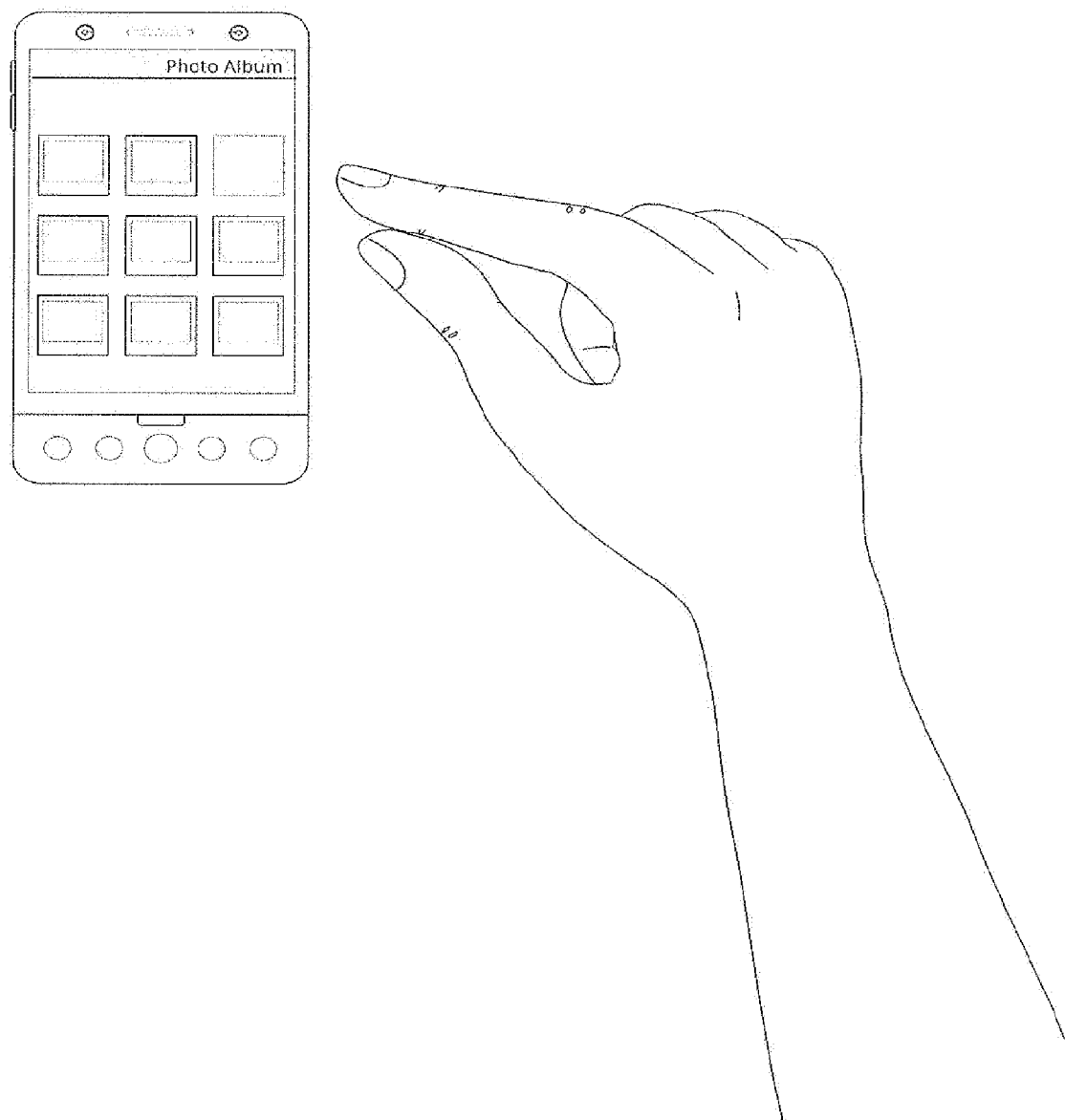
Figure 11E:
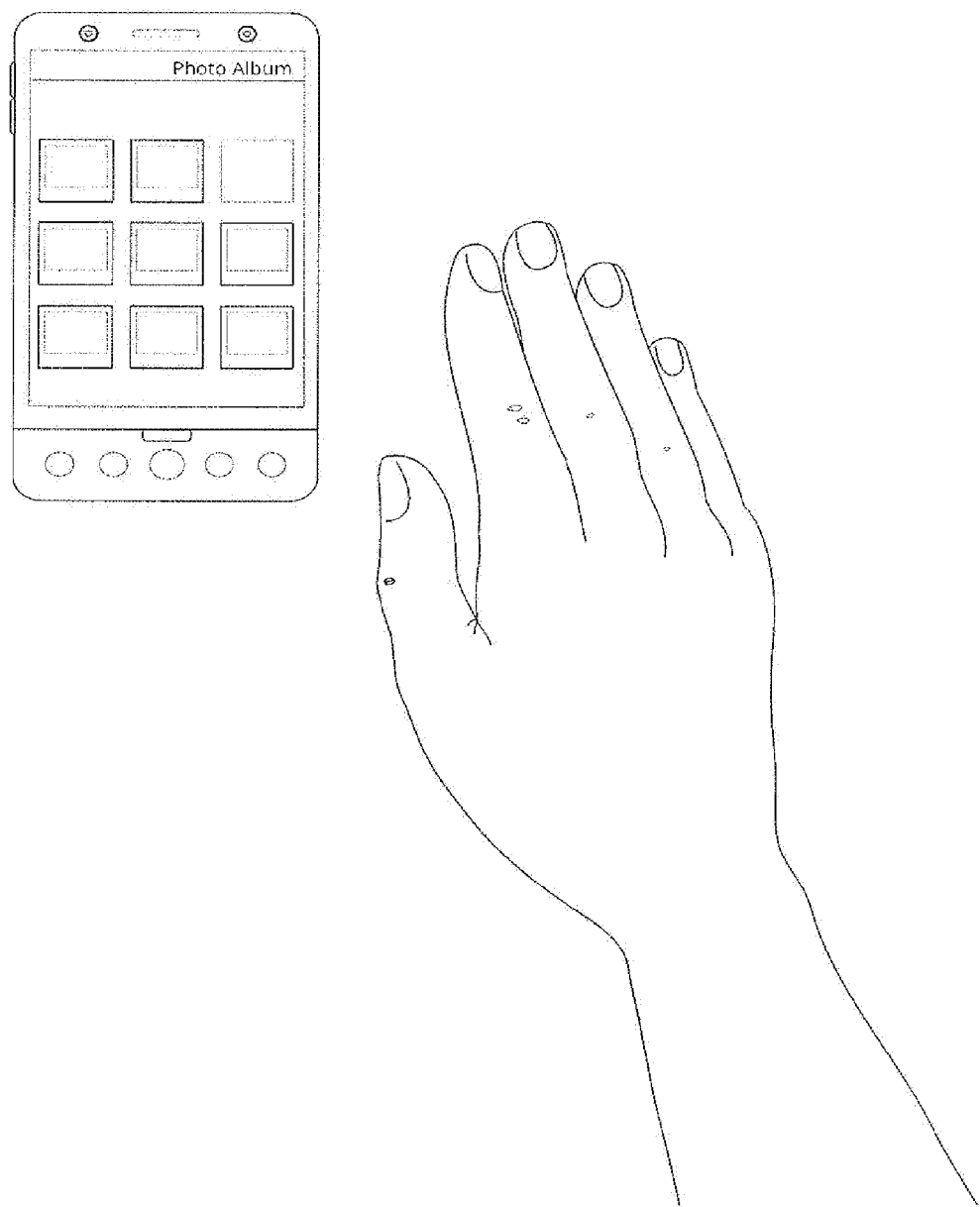
Figure 11F:
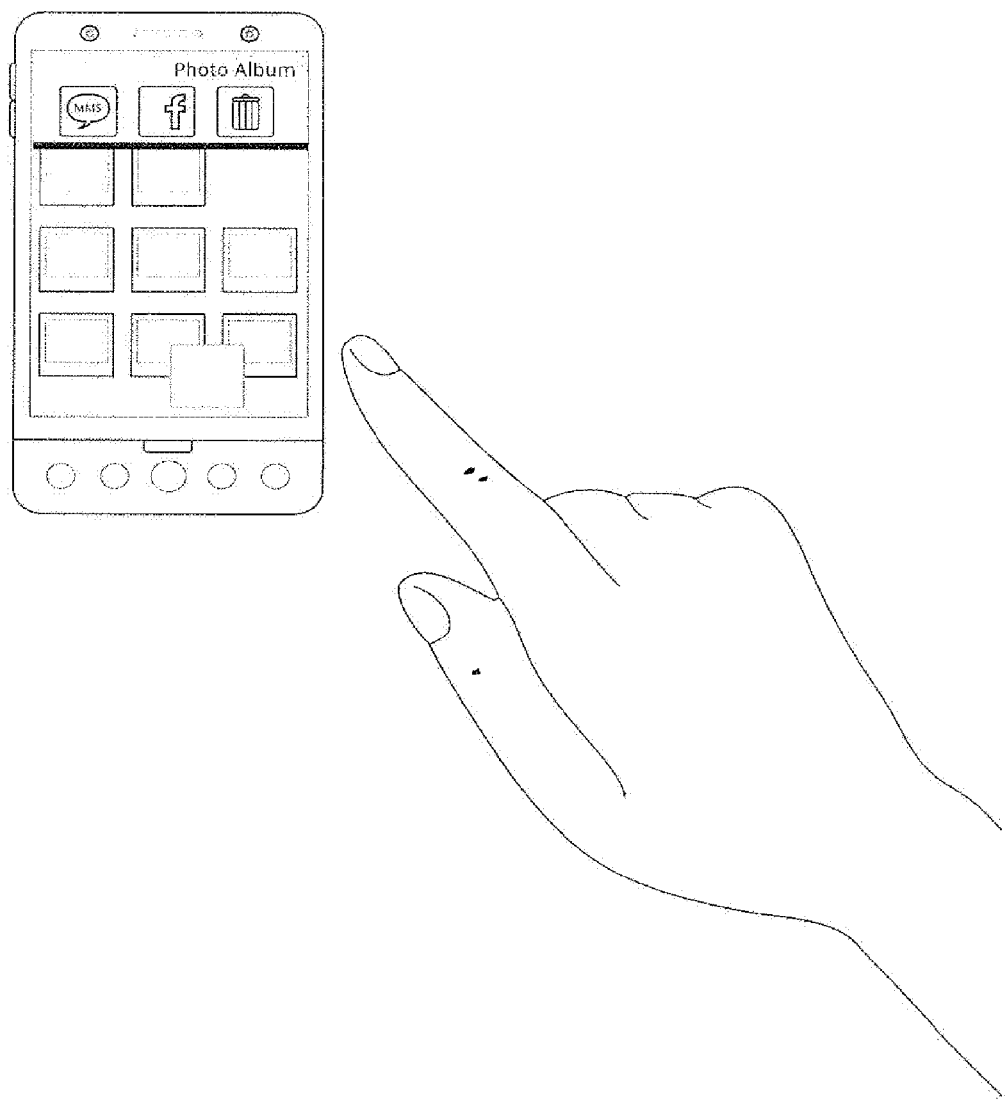
Figure 11G:
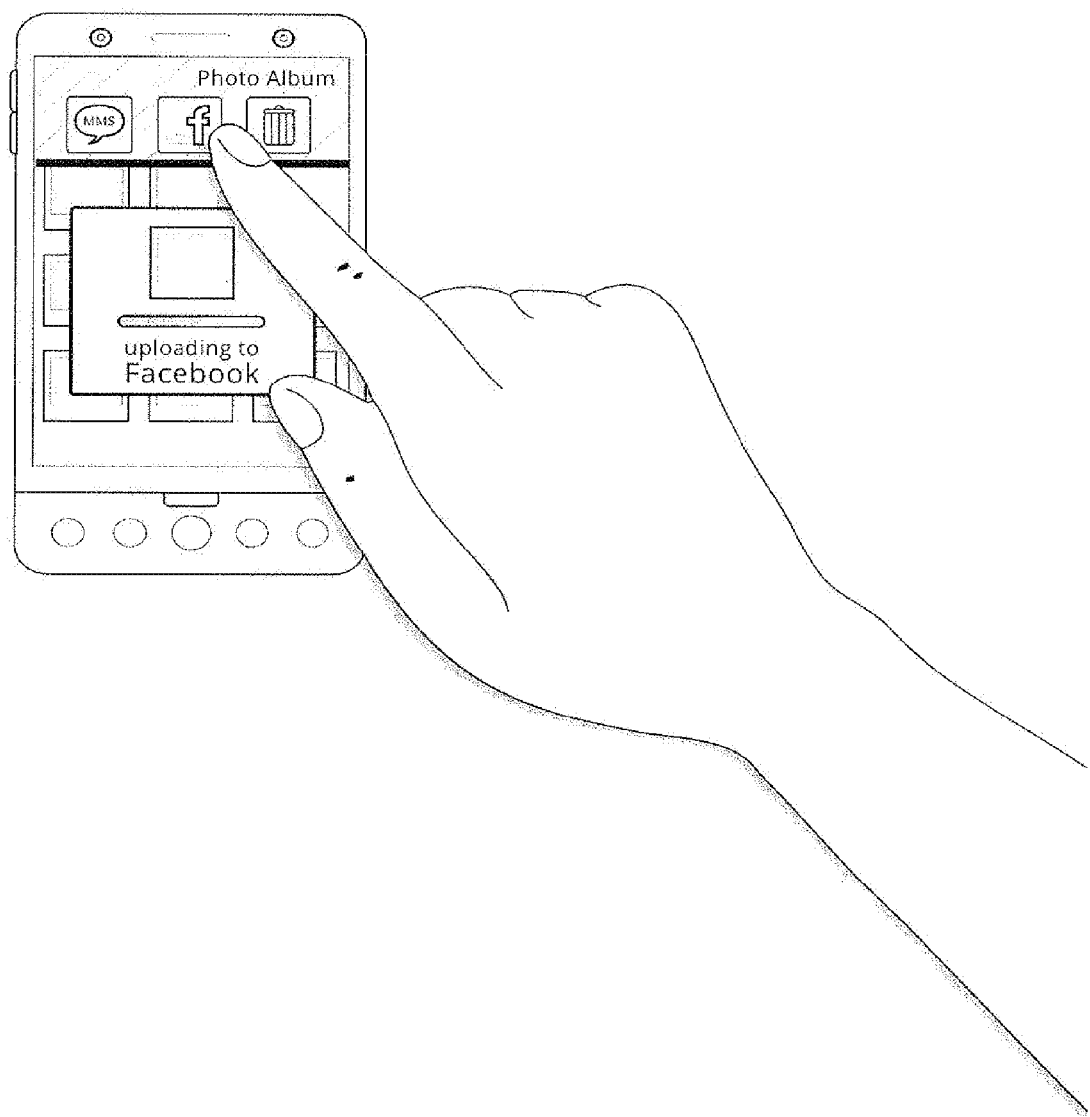

This is achieved by analyzing the gesture state transition diagrams, illustrated in general in FIGS. 6 and 9. Gestures are broken down to changes in position and shape, and those are the state diagrams illustrated in FIGS. 6 and 9. FIG. 6 shows the state transition diagrams for identifying the current pose of the object based on the current shape of the object. 6 $a$) is a generic pose state transition diagram for M poses, whereas 6 $b$)-$e$) are specific examples for M=0, M=1, M=2 and M=3 respectively. Example poses for a hand is given in FIG. 5, where $a$) indicates an undetermined "Null" pose, $b$) indicates a pointing pose, $c$) indicates a rigid whole hand pose, and $d$) indicates a pinching pose. This list of poses is by no means complete but rather serves as example poses that could be detected by the system. The example in FIG. 7 refers to the state change from $a$) the undetermined "Null" pose to $c$) a pointing hand pose via $b$) the intermediate pose. The pose state transition diagram shows all possible ways to navigate between the poses, and each transition can be given its own special feedback mechanism in the user interface. Of equal importance to the pose state transition diagram is the activation zone state transition diagram for identifying activation zone changes based on position changes. Example activation zones implementations are illustrated in FIG. 8 with $a$) defining four example activation zones as interaction volumes in 3D, $b$) interaction points in 3D, $c$) interaction areas in 2D, and $d$) interaction points in 2D. The exact placement of the activation zones is application dependant. FIG. 9 shows the state transition diagrams for identifying the current activation zone of the object based on the current position of the object. 9 $a$) is a generic activation zone state transition diagram for N poses, whereas 9 $b$)-$e$) are specific examples for N=0, N=1, N=2 and N=3 respectively. FIG. 10 illustrates and example where a hand is moving in front of the system, $a$) starting in activation zone Z2, $b$) being in an intermediary state in between the other zones, identified as moving most strongly towards activation zone Z4, and $c$) having reached activation zone Z4. As with the pose state transition diagram, each activation zone state transition can be given its own specific user interface feedback mechanism.

Continuing on the continuous feedback examples, in FIG. 13 another implementation of the media player is illustrated. In $a$) a media player in its idle state is shown. In $b$) a hand enters and is recognized by the system. This is illustrated in the UI by a particle system with particles in an idle state appearing. The particles' random motion shows that they are idle. In $c$) a subtle motion to the right is made with the hand, which the particles follow, and the "previous track" icon is slightly highlighted, indicating that this is the functionality triggered by that kind of gesture. In $d$) a distinct motion to the left is made and the "next track" is triggered as the particles move sharply to the left as well. The particle system concept is explored further in FIG. 14 that starts off just like the previous example a) and b). In FIG. 14 c) however, the user makes a pointed gesture that shows the intent of the user and that makes the particles focus in a tight spot. In d) it is shown that the grouped-together particles grab onto the underlying album art and drags it along when the finger is moved.

The particle system examples are included to illustrate the plethora of available visualization techniques that can be used to indicate to the user that the system is aware of the subtle changes in the user's gestures. Alternative means of visualizations includes, but is not limited to, color scheme changes, size changes of user interface elements, and various renditions of fields, such as magnetic fields or wind direction.

Although references has been heavy on graphical/visual feedback, auditory and other sensory feedback, such as haptic feedback, is of great importance. Audio in particular gives invaluable feedback in use cases where no hand is in contact with the device. It is very much so an aspect of this solution that many of the same parameters that could control a particle system in user feedback visualization would also control an audio synthesizer for giving continuous and relevant auditory feedback.

Moving back to the use cases, referring to FIG. 11, a compound use case comprising both the user triggered gesture subsystem activation and the continuous feedback is illustrated next. In a) a photo album application is illustrated. The off-screen gesture detection is powered down to conserve power. In b) the user starts a pinch gesture on the touch screen surface, indicating that the user wants to grab hold of a photo. Still, the sensor subsystem for detecting objects is without power. In c) the pinch gesture has been completed, and heuristics in the system has concluded the same thing, determining that this is a gesture that could be continued in front of the device, so the object detection subsystem is powered up, giving the system the ability to track the hand. In d) the fingers have been lifted up off the surface, and the photo is faded out more and more the further away the hand is. In e) the user releases the pinch pose. The photo still hovers translucently in the user interface. In f) the user points distinctly, indicates that he/she wants to take action with the photo, so an action list is brought up on the screen. Finally, in g) the user presses one icon on the action list on the touch screen, bringing the compound gesture to an end.

This use case illustrates that there are several ways to trigger the activation of the off-surface gesture detection subsystem, i.e. the camera(s), digital signal processor(s) and programs running on one or more of the processors. In this use case the touch screen gesture was a pinch gesture, but it should be obvious that any similar gesture, such as a single- or multi-finger slide, a long-press, a rotary gesture, a two handed gesture or even a simple tap or double-tap could be followed by an off-screen gesture.

Figure 18A:
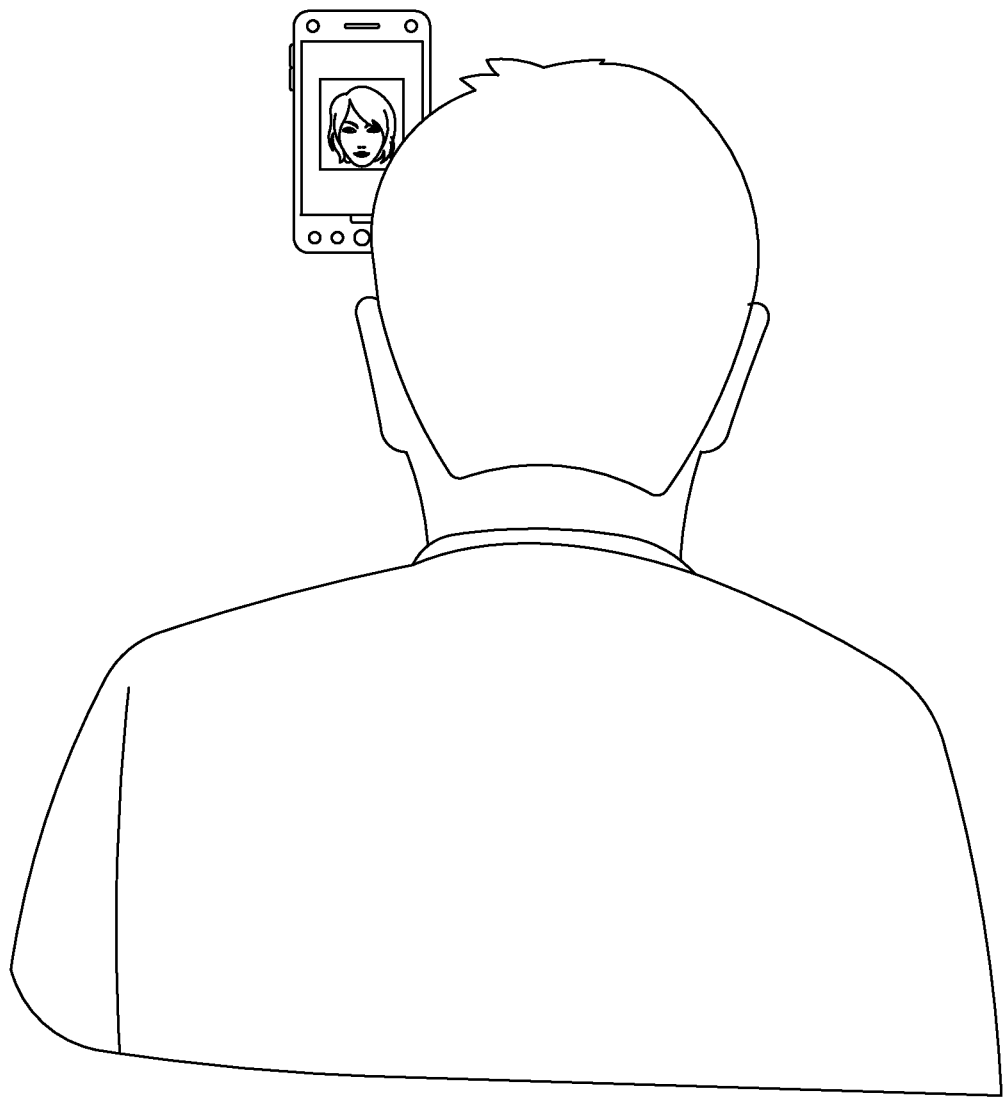
FIG. 18 illustrates a feedback use case for video telephony/conference: a) the user is in front of the device and sees his/her counterpart, and b) the user has moved to the side, so as feedback to the user to make him/her move to the left, the counterpart image is moved to the right.
Figure 18B:
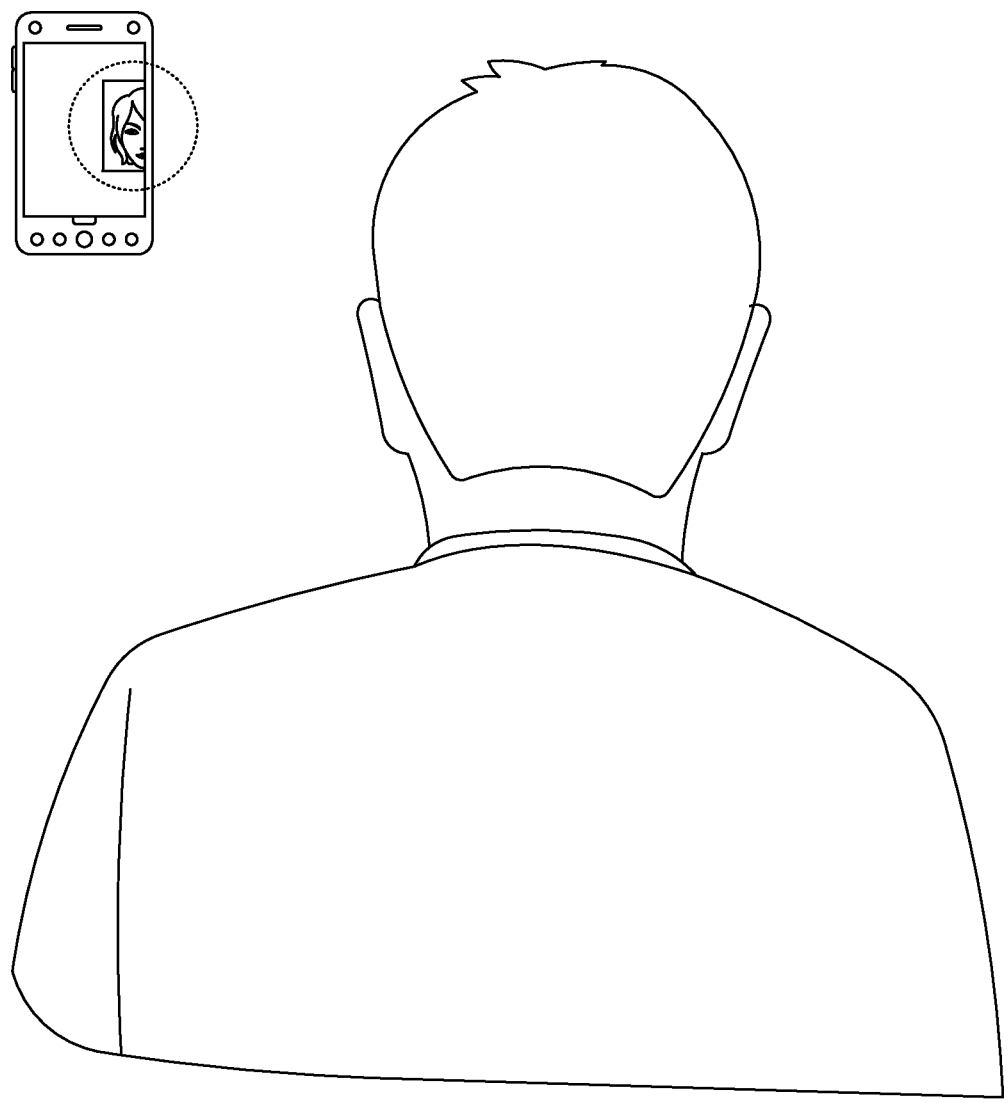

Moving away from the previous use cases of having as the only object a hand, we can also treat a user's face as an object that can be detected by the sensor subsystem. In FIG. 18 we illustrate this concept with a video telephony or a video conferencing application. Instead of occupying valuable screen estate with an image of the user to show him/her if he/she is in the picture, that feedback can be given indirectly by moving the image of the other party in the conversation. As illustrated in 18 a) the user is directly in front of the device, which is therefore showing the entire image of the other party. In b) the user has moved too far to the right and the image of the other party is subsequently moved to the right, giving the user all feedback he/she needs to correct his/her position. Similar activation zones as in FIG. 8 or FIG. 10 could very well be used for this use case.

The invention claimed is:
1. A computing device, comprising:
a display;
a touch screen for detecting on-surface user input;
a sensor subsystem for detecting off-surface objects; and
memory having instructions stored on it which when run on a processor, causes the processor to perform the steps of:
    setting the sensor subsystem to a powered-on state, from a powered-off state, when a predetermined on-surface gesture is detected via the touch screen;
    determining a compound gesture using a combination of the detected on-surface gesture and an off-surface gesture determined using the sensor subsystem by:
    detecting an off-surface object using the sensor subsystem;
    determining a position and a shape of said detected off-surface object;
    matching the determined position with a set of reference zones and the determined shape with a set of reference poses to thereby determine an off-surface gesture state;
    detecting changes in the determined position and shape of said detected off-surface object using the sensor subsystem;
    matching said changes in the determined position with transitions between said reference zones and matching said changes in determined shapes with transitions between said reference poses to thereby determine a transition between off-surface gesture states; and,
    instructing a user interface to provide feedback based on the compound gesture including the determined transition between off-surface gesture states.

2. The computing device of claim 1, wherein the feedback is at least one of graphical, auditory and haptic in nature.

3. The computing device of any preceding claim, wherein the feedback is a continuous feedback.

4. The computing device of claim 3, wherein the processor performs the further step of:
determining a degree of transition between off-surface gesture states and providing the continuous feedback based on said degree of transition.

5. The computing device of claim 4, wherein the degree of transition includes at least one of: where in between the reference zones the determined positions are present, where in between the reference poses the determined shapes are, which reference zone the determined position is closest and which reference pose the determined shape is closest.

6. The computing device of claim 1, wherein the reference zones are represented as at least one of volumes in a three-dimensional space, points in a three-dimensional space, areas in a two-dimensional space and points in a two-dimensional space.

7. The computing device of claim 1, wherein the sensor subsystem includes at least one of a single camera and two cameras in stereoscopic configuration.

8. The computing device of claim 1, wherein the set of reference zones and the set of reference poses are changeable.

9. A computer-implemented method, for operating a computing device comprising a display, a touch screen for detecting on-surface user input, sensor sub system, processor and memory, comprising the steps of:

setting the sensor subsystem to a powered-on state, from a powered-off state, when a predetermined on-surface gesture is detected via the touch screen;

determining a compound gesture using a combination of the detected on-surface gesture and an off-surface gesture determined using the sensor subsystem by:

detecting an off-surface object using the sensor subsystem;

determining a position and a shape of said detected off-surface object;

matching the determined position with a set of reference zones and the determined shape with a set of reference poses to thereby determine an off-surface gesture state;

detecting changes in the determined position and shape of said detected off-surface object using the sensor subsystem;

matching said changes in the determined position with transitions between said reference zones and matching said changes in determined shapes with transitions between said reference poses to thereby determine a transition between off-surface gesture states; and, instructing a user interface to provide feedback based on the compound gesture including the determined transition between off-surface gesture states.

10. A non-transitory computer-readable medium having stored on it instructions which when run on a processor cause the processor to carry out the method of claim 9.

* * * * *